US 8,862,910 B2

(12) United States Patent
Sato

(10) Patent No.: US 8,862,910 B2
(45) Date of Patent: Oct. 14, 2014

(54) PORTABLE INFORMATION PROCESSING TERMINAL WHICH OBTAINS A POWER CONSUMPTION BENCHMARK OF NEW APPLICATIONS

(75) Inventor: Yasunori Sato, Aichi (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 352 days.

(21) Appl. No.: 13/388,763

(22) PCT Filed: Mar. 2, 2011

(86) PCT No.: PCT/JP2011/001223
§ 371 (c)(1),
(2), (4) Date: Feb. 3, 2012

(87) PCT Pub. No.: WO2011/155106
PCT Pub. Date: Dec. 15, 2011

(65) Prior Publication Data
US 2012/0134517 A1     May 31, 2012

(30) Foreign Application Priority Data
Jun. 7, 2010   (JP) ................................ 2010-130508

(51) Int. Cl.
*G06F 1/00*        (2006.01)
*G06F 1/32*        (2006.01)
(Continued)

(52) U.S. Cl.
CPC ..... *H04M 1/72522* (2013.01); *G06F 2201/865* (2013.01); *Y02B 60/144* (2013.01); *G06F 11/3062* (2013.01); *G06F 1/3212* (2013.01);
(Continued)

(58) Field of Classification Search
CPC ............. G06F 1/3212; G06F 11/3062; G06F 11/3409; G06F 11/3466; G06F 2201/865; G06F 1/263; G06F 1/3228; G06F 9/4893; H02J 7/0047; H02J 7/025; H02J 2007/005; Y02B 60/144; H04M 1/72522
USPC .......................................................... 713/300
See application file for complete search history.

(56) References Cited

U.S. PATENT DOCUMENTS 5,557,557 A * 9/1996 Frantz et al. .................... 703/22
7,541,776 B2 * 6/2009 Tupman et al. ................ 320/134
(Continued)

FOREIGN PATENT DOCUMENTS

JP    2005-80385      3/2005
JP    2006-350481     12/2006
(Continued)

OTHER PUBLICATIONS

International Search Report issued May 10, 2011 in corresponding International Application No. PCT/JP2011/001223.

*Primary Examiner* — Chun Cao
*Assistant Examiner* — Danny Chan
(74) *Attorney, Agent, or Firm* — Wenderoth, Lind & Ponack, L.L.P.

(57) ABSTRACT

A portable information processing terminal is provided which can display an application execution-enabled time period. A download section 122 stores, in an application storage section 103, an application obtained from an outside. An application management table 500 has registered therein a power consumption, per unit time, for the application stored in the application storage section 103. A power measurement section 110 measures the power consumption per unit time for the application which is being executed. An application status management section 100 manages the application management table 500, and calculates the execution-enabled time period for the application, based on the power consumption for the application per unit time, and a remaining battery power in a battery section 15. A display section 11 displays the execution-enabled time period for the application.

19 Claims, 28 Drawing Sheets

| APPLICATION | APPLICATION STORAGE LOCATION | JUST-DOWNLOADED STATE INFORMATION (FLAG) | POWER MEASUREMENT MODE | POWER CONSUMPTION INFORMATION |
|---|---|---|---|---|
| APPLICATION A | /system/app/appA.apk | TRUE | EXECUTABLE | 0 |
| APPLICATION B | /system/app/appB.apk | FALSE | NOT EXECUTABLE | 800mW |
| APPLICATION C | /system/app/appC.apk | TRUE | EXECUTABLE | 0 |
| ⋮ | ⋮ | | ⋮ | ⋮ |

500

(51) Int. Cl.
*H04W 52/02* (2009.01)
*G06F 1/26* (2006.01)
*G06F 9/48* (2006.01)
*H04M 1/725* (2006.01)
*G06F 11/30* (2006.01)
*H02J 7/00* (2006.01)
*G06F 11/34* (2006.01)
*H02J 7/02*

(52) U.S. Cl.
CPC .... (2006.01) *H04W 52/0261* (2013.01); *G06F 1/263* (2013.01); *H02J 2007/005* (2013.01); *G06F 11/3409* (2013.01); *G06F 11/3466* (2013.01); *H02J 7/0047* (2013.01); *H02J 7/025* (2013.01); *G06F 9/4893* (2013.01); *G06F 1/3228* (2013.01)
USPC .......................................................... 713/300

(56) References Cited

U.S. PATENT DOCUMENTS

| | | |
|---|---|---|
| 2005/0046390 A1 | 3/2005 | Kimura |
| 2007/0192641 A1* | 8/2007 | Nagendra et al. ............. 713/320 |
| 2008/0200220 A1* | 8/2008 | Jackson ........................ 455/574 |
| 2008/0242369 A1* | 10/2008 | Kazuta et al. ................. 455/573 |

FOREIGN PATENT DOCUMENTS

| | | |
|---|---|---|
| WO | 2006/134932 | 12/2006 |
| WO | 2010/007913 | 1/2010 |

* cited by examiner

F I G. 2
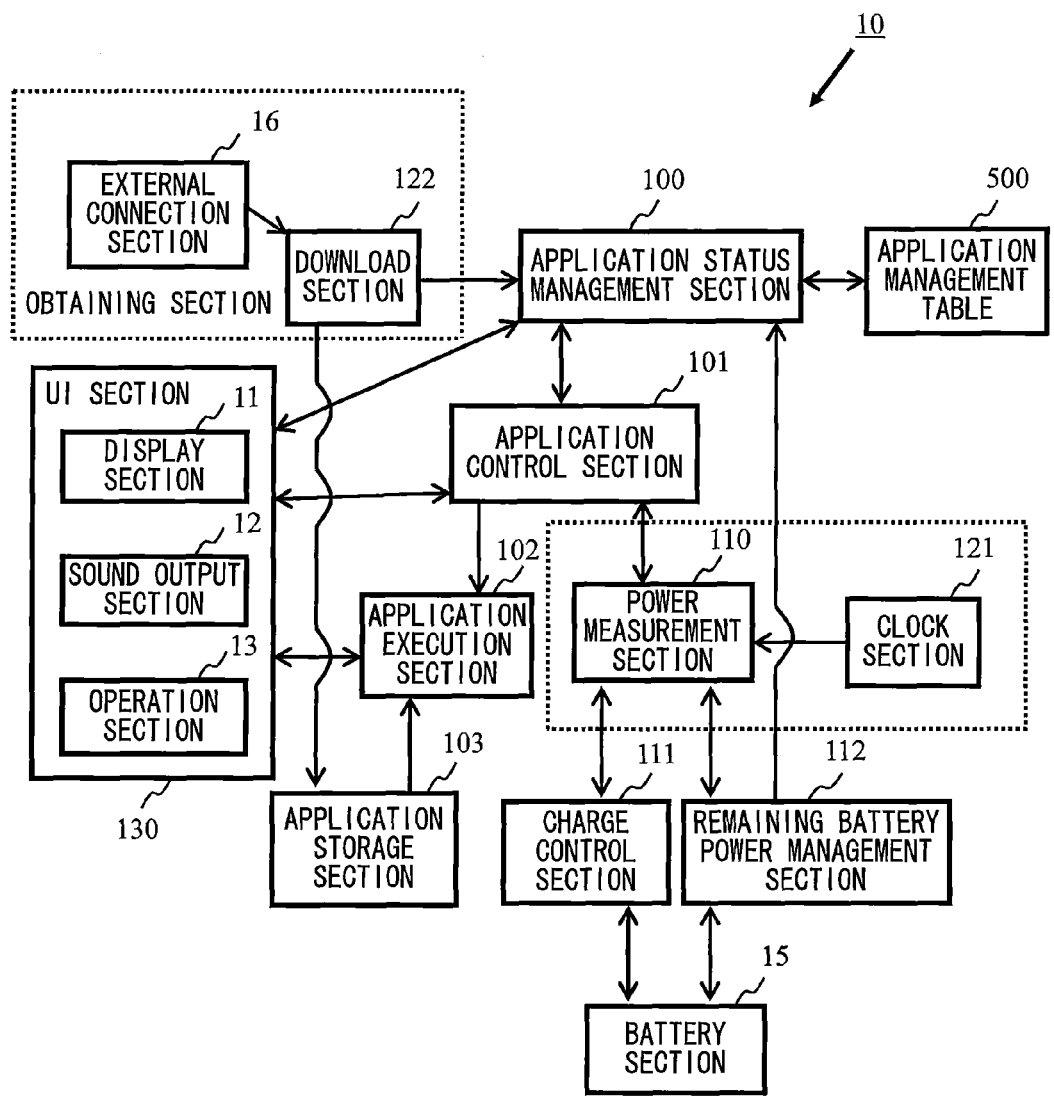

F I G. 3

| APPLICATION | APPLICATION STORAGE LOCATION | JUST-DOWNLOADED STATE INFORMATION (FLAG) | POWER CONSUMPTION INFORMATION |
|---|---|---|---|
| APPLICATION A | /system/app/appA.apk | TRUE | 0 |
| APPLICATION B | /system/app/appB.apk | FALSE | 800mW |
| APPLICATION C | /system/app/appC.apk | TRUE | 0 |
| ⋮ | ⋮ | ⋮ | ⋮ |

| INDICATION MARK | EXECUTION-ENABLED TIME PERIOD |
|---|---|
| ◎ | EXECUTION-ENABLED TIME PERIOD IS LONGER THAN OR EQUAL TO THREE HOURS |
| ○ | EXECUTION-ENABLED TIME PERIOD IS BETWEEN ONE HOUR AND THREE HOURS |
| △ | EXECUTION-ENABLED TIME PERIOD IS BETWEEN TWENTY MINUTES AND ONE HOUR |
| × | EXECUTION-ENABLED TIME PERIOD IS SHORTER THAN TWENTY MINUTES |
| ? | JUST DOWNLOADED STATE |

F I G. 1 6
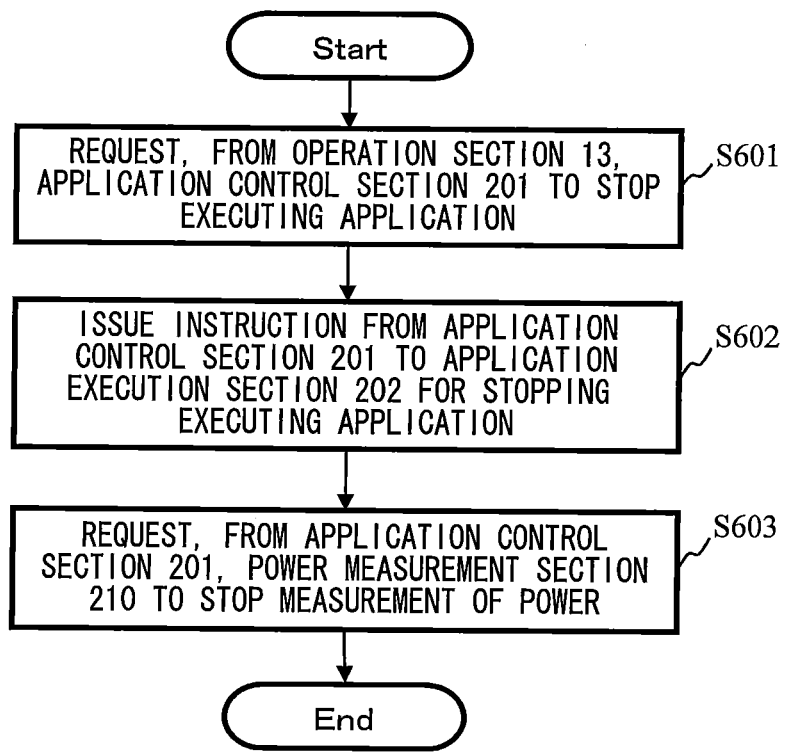

F I G. 1 7
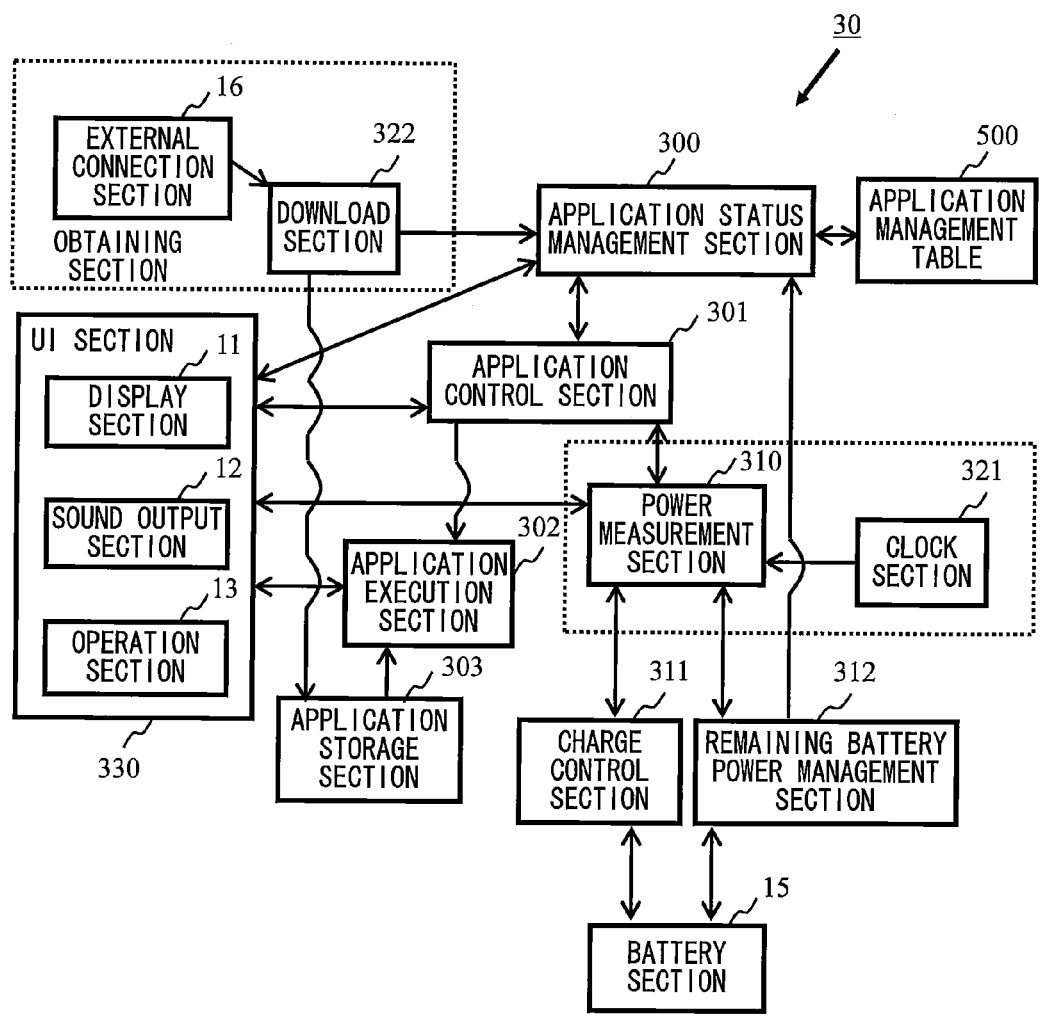

F I G. 1 8
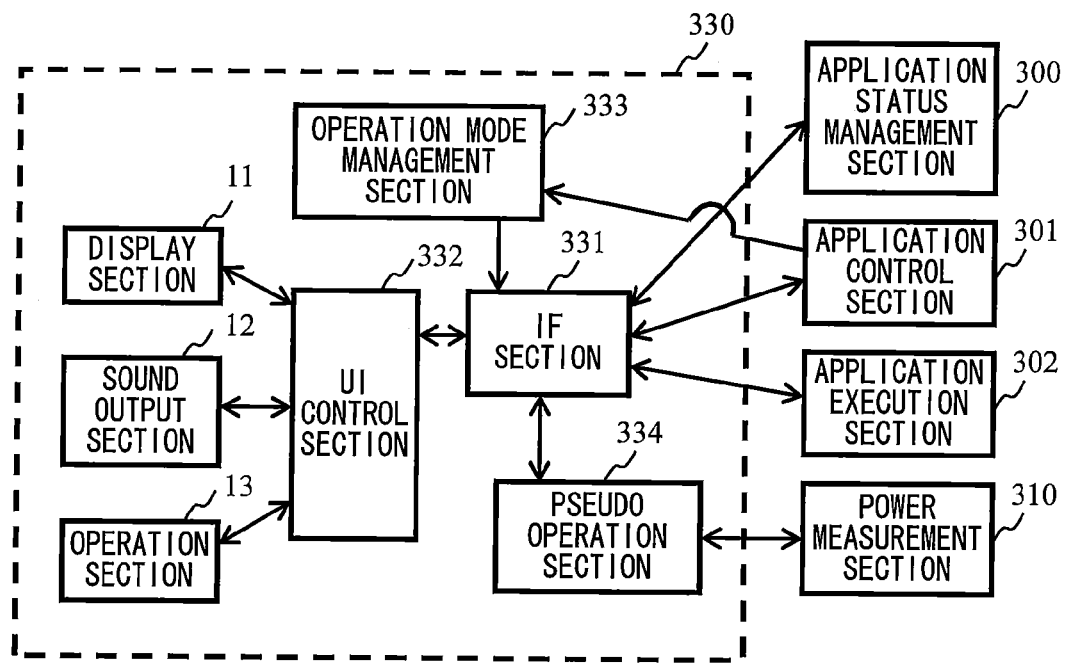

F I G. 2 5
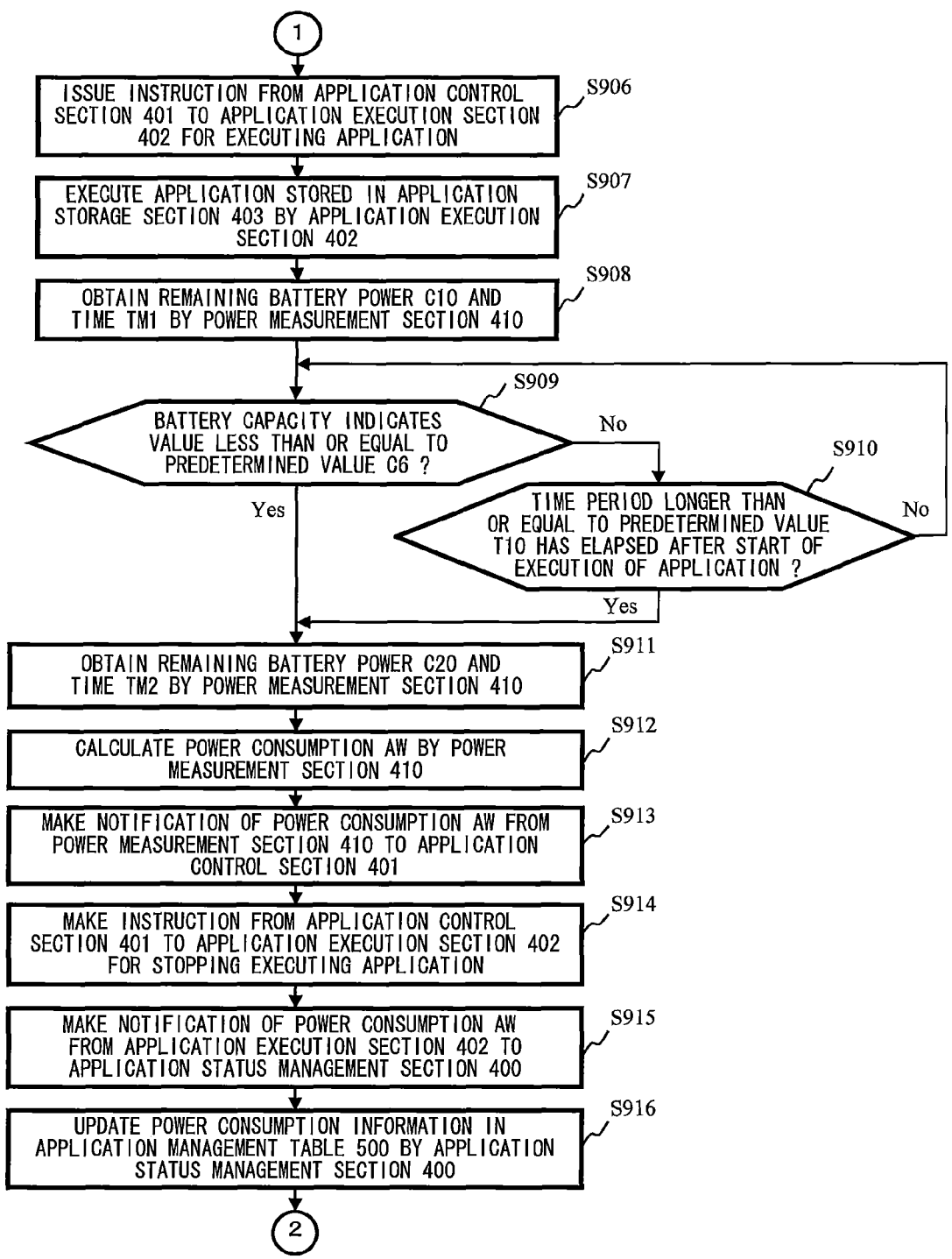

| APPLICATION | APPLICATION STORAGE LOCATION | JUST-DOWNLOADED STATE INFORMATION (FLAG) | POWER MEASUREMENT MODE | POWER CONSUMPTION INFORMATION |
|---|---|---|---|---|
| APPLICATION A | /system/app/appA.apk | TRUE | EXECUTABLE | 0 |
| APPLICATION B | /system/app/appB.apk | FALSE | NOT EXECUTABLE | 800mW |
| APPLICATION C | /system/app/appC.apk | TRUE | EXECUTABLE | 0 |
| ⋮ | ⋮ | | ⋮ | ⋮ |

PORTABLE INFORMATION PROCESSING TERMINAL WHICH OBTAINS A POWER CONSUMPTION BENCHMARK OF NEW APPLICATIONS

TECHNICAL FIELD

The present invention relates to portable information processing terminals in which application programs can be installed, and more particularly to portable information processing terminals capable of managing and displaying power consumption for executing installed application programs.

BACKGROUND ART

In recent years, portable information processing terminals which can execute various applications for games, music listening, television viewing, photographing with cameras, and the like, in addition to voice communication, are explosively widespread. Time periods during which the applications can be executed according to remaining battery powers and/or loaded states of hardware resources of the portable information processing terminals, are different among these portable information processing terminals. Therefore, it is greatly advantageous that, when a user of the portable information processing terminal operates to execute any one of the applications, the user can recognize a time period during which the application can be executed with a remaining battery power at that time.

As conventional portable information processing terminals, portable information processing terminals each of which displays a time period during which a specific application can be executed according to a state of a remaining battery power having been most recently measured, have been known (for example, see Patent Literature 1). A portable information processing terminal described in Patent Literature 1 includes a table in which a power consumption for each application is registered, and calculates a time period during which a specific application can be executed, according to the power consumption registered in the table, and a remaining battery power having been most recently measured.

CITATION LIST

Patent Literature

Patent Literature 1: Japanese Laid-Open Patent Publication No. 2005-80385

SUMMARY OF THE INVENTION

Problems to be Solved by the Invention

However, the conventional portable information processing terminal needs to assuredly obtain in advance power consumption information for the own terminal for each application by using some means. Therefore, there is a problem that an execution-enabled time period for an application, such as a later-installed application, for which power consumption information for the own terminal has not been previously obtained, cannot be calculated.

In particular, when an application can be executed by an unspecified terminal, it is difficult for all terminals which are able to execute the application to previously indicate the power consumption, and the conventional portable information processing terminals cannot calculate the execution-enabled time period. The execution-enabled time period for each application is required to be displayed also when the power consumption information for the application in the own terminal has not been previously obtained.

Therefore, in order to solve the aforementioned problem of the conventional art, an object of the present invention is to make available a portable information processing terminal that is able to display an application execution-enabled time period for even an unspecified application for which power consumption information for the own terminal has not been previously obtained, before the application is explicitly executed by a user.

Solution to the Problems

In order to attain the aforementioned objects, a portable information processing terminal of the present invention includes: an application storage section in which an application is stored; an obtaining section for obtaining an application from an outside, and storing the obtained application in the application storage section; an application management table in which a power consumption, per unit time, for the application stored in the application storage section, is registered; a battery section for supplying power to the portable information processing terminal; a charge control section for detecting for connection to a battery charger, and controlling whether the battery section is to be charged by using the battery charger; a remaining battery power management section for managing a remaining battery power in the battery section; an application control section for requesting the application stored in the application storage section to be executed; an application execution section for executing the application according to a request from the application control section; a power measurement section for measuring the power consumption per unit time for the application which is being executed; an application status management section for managing the application management table, and calculating an execution-enabled time period for the application, based on the power consumption for the application per unit time, and the remaining battery power in the battery section; and a display section for displaying the execution-enabled time period for the application.

A flag indicating whether the power consumption information per unit time has been obtained or not is stored in the application management table for each application stored in the application storage section. Further, the obtaining section stores, when the application is obtained, the flag indicating that the power consumption information for the application per unit time has not been obtained, through the application status management section, in the application management table.

The portable information processing terminal further includes an operation section for receiving an operation from a user. The application status management section: obtains a value of the remaining battery power from the remaining battery power management section, and obtains, from the application management table, a value of the power consumption for each application per unit time, when the user requests, through the operation section, the execution-enabled time, period for each application to be displayed; and calculates the execution-enabled time period for each application, based on the remaining battery power and the power consumption per unit time, and displays, on the display section, the execution-enabled time period having been calculated.

Further, the portable information processing terminal further includes an operation section for receiving an operation from a user. The application status management section: obtains a value of the remaining battery power from the remaining battery power management section, and obtains, from the application management table, a value of the power consumption for each application per unit time, and the flag, when the user requests, through the operation section, the execution-enabled time period for each application to be displayed; calculates the execution-enabled time period for the application for which the flag does not indicate that the power consumption information per unit time has not been obtained, based on the remaining battery power, and the power consumption per unit time, and displays, on the display section, the execution-enabled time period having been calculated; and indicates, for the application for which the flag indicates that the power consumption information per unit time has not been obtained, that the execution-enabled time period has not been obtained, on the display section.

The power measurement section: issues an instruction for stopping charging the battery section, and requests the application control section to execute the application for which the power consumption information per unit time has not been obtained, when determining through the charge control section that the portable information processing terminal is connected to the battery charger, and determining through the remaining battery power management section that the remaining battery power of the battery section indicates a value greater than or equal to a first predetermined value; and requests the application control section to stop executing the application, measures the power consumption for the application per unit time, and issues, through the charge control section, an instruction for restarting charging the battery section, when determining through the remaining battery power management section that the remaining battery power of the battery section indicates a value less than or equal to a second predetermined value, or determining that a time period longer than or equal to a predetermined time' period has elapsed after start of execution of the application.

The power measurement section obtains, through the remaining battery power management section, a difference between a remaining battery power of the battery section at the start of the execution of the application, and a remaining battery power of the battery section at stop of the execution of the application, and measures the power consumption for the application, per unit time based on the obtained difference in the remaining battery power, and a time period in which the application has been executed.

Preferably, the power measurement section: requests the application control section to execute the application for which the power consumption information per unit time has not been obtained, when determining through the charge control section that the portable information processing terminal is connected to the battery charger, and the remaining battery power of the battery section indicates a value greater than or equal to a first predetermined value; and requests the application control section to stop executing the application, and measures the power consumption for the application per unit time, when determining through the charge control section that the remaining battery power of the battery section indicates a value less than or equal to a second predetermined value, or determining that a time period longer than or equal to a predetermined time period has elapsed after start of execution of the application.

The power measurement section obtains, through the remaining battery power management section, a difference between a remaining battery power of the battery section at the start of the execution of the application, and a remaining battery power of the battery section at stop of the execution of the application, and obtains, through the charge control section, a capacity of the battery section that is charged from the start of the execution of the application to the stop of the execution of the application, to measure the power consumption for the application per unit time, based on the obtained difference in the remaining battery power, the capacity obtained by the charging, and a time period in which the application has been executed.

When execution of the application is requested, the application control section obtains a list of applications for each of which the power consumption information per unit time has not been obtained, through the application status management section, from the application management table, causes the application execution section to execute each application contained in the obtained list, and notifies the power measurement section that the application has been executed.

The application control section registers the power consumption for the application per unit time, which has been measured by the power measurement section, and the flag indicating that the power consumption information per unit time has been obtained, through the application status management section, in the application management table.

When an operation performed by the user is detected through the operation section, the application control section instructs the application execution section to stop executing the application, instructs the power measurement section to stop measuring the power consumption, and instructs the charge control section to restart charging the battery section.

The portable information processing terminal further includes: a sound output section for outputting a sound; a UI control section for controlling the display section and the sound output section; a pseudo operation section for merely making a response without controlling the display section and the sound output section when receiving a control request for the display section and the sound output section, and storing, according to a request from the power measurement section, a status of an operation required for each of the display section and the sound output section based on the control request for each of the display section and the sound output section; an IF section that implements operation modes that are a normal operation mode and a pseudo operation mode, and, when receiving a request from any one of the application status management section, the application control section, and the application execution section, notifies the UI control section of the request in the case of the operation mode representing the normal operation mode, and notifies the pseudo operation section of the request in the case of the operation mode representing the pseudo operation mode; and an operation mode management section for controlling the operation modes of the IF section based on an operation mode setting request from the application control section. The power measurement section holds therein power consumption data based on a status of an operation of each of the display section and the sound output section.

The application control section requests, when the application contained in the obtained list is executed by the application execution section, the operation mode management section to operate for shifting to the pseudo operation mode, and requests, when the execution of the application has been ended, the operation mode management section to operate for shifting to the normal operation mode.

The power measurement section obtains, through the remaining battery power management section, a difference between a remaining battery power of the battery section at start of execution of the application, and a remaining battery power of the battery section at stop of the execution of the application, and measures the power consumption for the application per unit time based on the obtained difference in the remaining battery power, a time period in which the application has been executed, and the status of the operation which is required for each of the display section and the sound output section, and which is stored by the pseudo operation section.

In a power measurement mode that is an application operation mode specialized for measuring power, the application execution section executes the application. Further, the portable information processing terminal may further include an application operation preference information storage section for storing a status of an operation, per unit time, of the application which is being executed. The application execution section executes the application, based on application operation preference information stored in the application operation preference information storage section. The power measurement section measures the power consumption per unit time for the application when the application is executed.

Further, the present invention is also directed to a method performed by a portable information processing terminal including a battery section, an application storage section, and a display section. The method includes the steps of: obtaining an application from an outside, and storing the obtained application in the application storage section; supplying power to the portable information processing terminal from the battery section; detecting for connection to a battery charger, and controlling whether the battery section is to be charged by using the battery charger; managing a remaining battery power in the battery section; making a request for executing the application stored in the application storage section; executing the application according to the request; measuring a power consumption per unit time for the application which is being executed; managing an application management table in which the power consumption, per unit time, for the application is registered; calculating an execution-enabled time period for the application, based on the power consumption for the application per unit time, and the remaining battery power in the battery section; and displaying the execution-enabled time period for the application on the display section. Moreover, the present invention may be implemented as a program for causing a portable information processing terminal to execute the method described above.

Advantageous Effects of the Invention

As described above, in the portable information processing terminal according to the present invention, the application control section executes an application for which power consumption information per unit time has not been obtained, according to a notification from the application status management section, while connection to the battery charger occurs, and the power measurement section measures the power consumption, per unit time, for the application being executed. Thus, the power consumption, per unit time, for the application for which the power consumption information has not been obtained can be measured, and a user is allowed to recognize, before the user explicitly operates to execute an unspecified application, the execution-enabled time period of the application. Further, while the connection to the battery charger occurs, the power consumption per unit time for the application for which the power consumption information has not been obtained is measured, so that a disadvantage for a user that a battery capacity is completely used up due to a process of measuring the power consumption can be overcome.

BRIEF DESCRIPTION OF THE DRAWINGS

FIG. 2 is a block diagram illustrating an exemplary configuration of a portable information processing terminal 10 according to a first embodiment of the present invention.

FIG. 3 illustrates an example of an application management table.

FIG. 6 illustrates an exemplary indication of execution-allowable time periods for the applications.

FIG. 16 illustrates an example of a flow chart for a process performed when an operation is performed by a user in the case of the connection to the battery charger occurring, according to the second embodiment of the present invention.

FIG. 17 is a block diagram illustrating an exemplary configuration of a portable information processing terminal 30 according to a third embodiment of the present invention.

FIG. 18 is a block diagram illustrating an exemplary configuration of a UI section 330 according to the third embodiment of the present invention.

FIG. 25 illustrates an example of a flow chart for a process performed when a power consumption is being measured, according to the fourth embodiment of the present invention.

DESCRIPTION OF EMBODIMENTS

Hereinafter, portable information processing terminals according to embodiments of the present invention will be described with reference to the drawings.
<Outer Appearance of Portable Information Processing Terminal>

Firstly, an outer appearance of a portable information processing terminal according to each embodiment of the present invention will be described.

Figure 1:
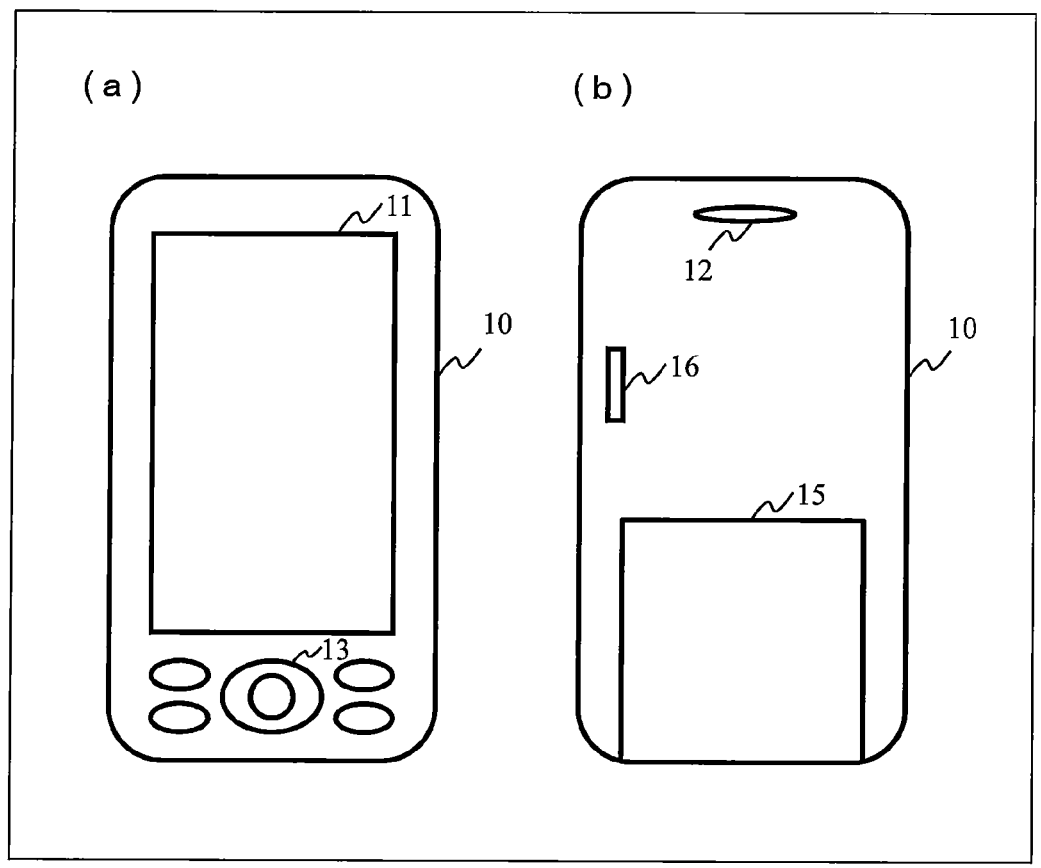
FIG. 1 illustrates an exemplary outer appearance of a portabl information processing terminal according to the present invention.

FIG. 1 illustrates an exemplary outer appearance of a portable information processing terminal 10 according to each embodiment of the present invention. FIG. 1(a) shows an outer appearance of the portable information processing terminal 10 as viewed from the front thereof, and FIG. 1(b) shows an outer appearance of the portable information processing terminal 10 as viewed from the back surface thereof. In FIG. 1, the portable information processing terminal 10 includes a display section 11, a sound output section 12, an operation section 13, a battery section 15, an external connection section 16, and the like.

The display section 11 performs a screen display, and is implemented as an LCD (liquid crystal display) or the like. Further, the display section 11 may be included in a system of the portable information processing terminal 10 as shown in FIG. 1. Alternatively, a signal may be outputted to an external display device outside the portable information processing terminal 10 so as to use the external display device for performing a display.

The sound output section 12 outputs a sound, and is implemented as a loudspeaker or the like. The operation section 13 receives an operation from a user, and is implemented as a key, a touch panel, a game controller, or the like. The battery section 15 is a battery for actuating the portable information processing terminal 10. The battery section 15 can be charged via a battery charger (not shown) by an external power supply, to store power. The external connection section 16 is used for obtaining an application from the outside, and is implemented as a component, such as a USB or a LAN, for performing wired-connection, or a component, such as a wireless LAN or the Bluetooth technology, for performing wireless connection. Further, the external connection section 16 can connect, by communication, between an application being executed and the outside. The external connection section 16 may obtain an application via a storage medium such as a CD or a DVD.

(First Embodiment)

The portable information processing terminal 10 according to a first embodiment of the present invention will be described.
<Configuration of Portable Information Processing Terminal 10>

FIG. 2 is a block diagram illustrating an exemplary configuration of the portable information processing terminal 10 according to the first embodiment of the present invention. As shown in FIG. 2, the portable information processing terminal 10 according to the first embodiment includes the battery section 15, the external connection section 16, an application status management section 100, an application control section 101, an application execution section 102, an application storage section 103, a power measurement section 110, a charge control section 111, a remaining battery power management section 112, a clock section 121, a download section 122, a UI (User Interface) section 130, an application management table 500, and the like.

The application status management section 100 manages the application management table 500 in which application power consumption information is stored. The application power consumption information represents a power consumed per unit time when an application program is executed by the portable information processing terminal 10 (own terminal). Further, an application represents a concept including an application program. The application status management section 100 notifies the UI section 130 of an execution-enabled time period for an application registered in the application management table 500. At this time, the application status management section 100 divides a value of a remaining battery power obtained from the remaining battery power management section 112, by a value of a power consumption for the application per unit time, which is obtained from the application management table 500, to calculate the execution-enabled time period for the application, and the UI section 130 is notified of the execution-enabled time period for each application. Further, the application status management section 100 performs reading from and writing in the application management table 500, according to requests from the application control section 101 and the download section 122. The application management table 500 will be described below with reference to FIG. 3.

The application control section 101 controls execution of the applications. The application control section 101 obtains, from the application status management section 100, information of an application to be executed, and notifies the application execution section 102 of a location in which the application is stored, and the like, to enable execution of the application. Further, the application control section 101 notifies the power measurement section 110 that the execution of the application is started and the execution of the application is ended, in order to obtain the power consumption information for the application per unit time.

The application execution section 102 executes an application stored (having been installed) in the application storage section 103. When an application is executed, the application execution section 102 transfers, to the UI section 130, data of a video to be displayed and data of a sound to be outputted, and obtains user operation information from the UI section 130.

The application storage section 103 stores applications. The applications may be stored before the portable information processing terminal 10 is delivered, or may be stored when the application is obtained by using the download section 122 after delivery.

The power measurement section 110 measures a power consumption, per unit time, for an application being executed. The power measurement section 110 measures a power consumption when receiving, from the application control section 101, a notification that the execution of the application is started, and a notification that the execution of the application is stopped. The power measurement section 110 instructs the charge control section 111 to stop a charging operation when requesting execution of an application, and obtains, from the remaining battery power management section 112, a value of a remaining battery power measured when the execution of the application is started, and a value of a remaining battery power measured when the execution of the application is stopped, and calculates a difference between the remaining battery powers having been obtained, to calculate a power consumption for the application. Further, the power measurement section 110 obtains, from the clock section 121, a time at which the execution of the application is started, and a time at which the execution of the application is stopped (namely, a time period in which the application is executed), to measure the power consumption per unit time. The clock section 121 measures a time, and notifies the power measurement section 110 of the time. The clock section 121 may be included in a structure of the power measurement section 110 as a part thereof.

The charge control section 111 controls whether an operation of charging the battery section 15 is to be stopped or restarted, according to an instruction from the power measurement section 110. The remaining battery power management section 112 obtains a value of a remaining battery power of the battery section 15. The remaining battery power management section 112 notifies the power measurement section 110 and the application status management section 100 of the remaining battery power of the battery section 15.

The download section 122 controls the external connection section 16 to obtain an application from the outside. When obtaining an application from the outside, the download section 122 stores the application in the application storage section 103, and notifies the application status management section 100 that the application is added, in order to register the application in the application management table 500. The download section 122 and the external connection section 16 form a configuration for obtaining applications, and may be collectively referred to as an obtaining section.

The UI section 130 includes the display section 11, the sound output section 12, the operation section 13, and the like. The UI section 130 notifies each component of contents of an operation performed by a user on the operation section 13. Further, the UI section 130 performs a screen display on the display section 11, and performs a sound output from the sound output section 12 according to an instruction from each component. The UI section 130 may simply include the display section 11.

The application management table 500 is a table in which power consumption information for each of the applications stored in the application storage section 103 is stored. The application management table 500 is stored in a storage region (not shown) in the portable information processing terminal 10. FIG. 3 illustrates an example of the application management table 500 according to the present invention. In FIG. 3, in the application management table 500, an application storage location, just-downloaded state information, the power consumption information, and the like are stored for each application. The application storage location represents a location, in the application storage section 103, in which the application is stored. The just-downloaded state information is information that indicates whether an application has been just stored in the application storage section 103, and therefore the power consumption information of the application has not been obtained. For example, TRUE indicates that the power consumption information has not been obtained, and FALSE indicates that the power consumption information has been obtained. As described above, the just-downloaded state information is handled as a flag indicating whether the power consumption information for an application per unit time has been obtained or not.

<Download of Application>

Figure 4:
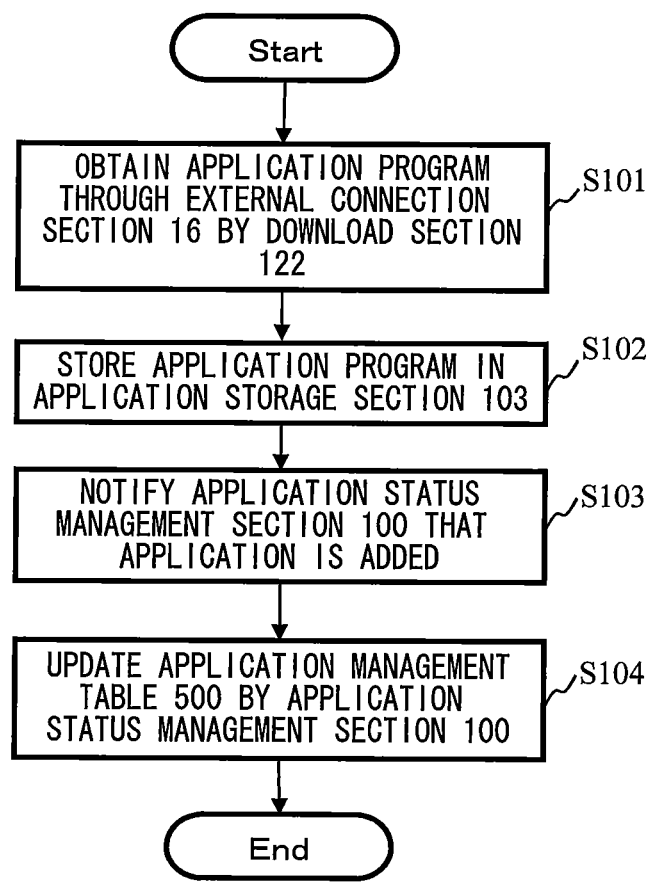
FIG. 4 illustrates an example of a flow chart for a process performed when an application is downloaded according to the first embodiment of the present invention.

Subsequently, an internal process of the portable information processing terminal 10 performed when an application is downloaded will be described with reference a flow chart shown in FIG. 4. As shown in FIG. 4, the download section 122 firstly obtains an application from the external connection section 16 (step S101). When the application has been obtained, the download section 122 stores the application in the application storage section 103 (step S102). When the storage has been completed, the download section 122 notifies the application status management section 100 of information about the added application (step S103). Notification of information representing an application name, an application storage location, and the like is made. Finally, the application status management section 100 updates the application management table 500 (step S104).

As contents to be updated in the application management table 500, for example, the application name obtained from the application status management section 100 is added in the application management table 500 shown in FIG. 3, a location in which the application is stored is set to the application storage location, TRUE is set to the just-downloaded state information, and 0 is set to the power consumption information.

<Display of Execution-Enabled Time Period for Application>

Figure 7:
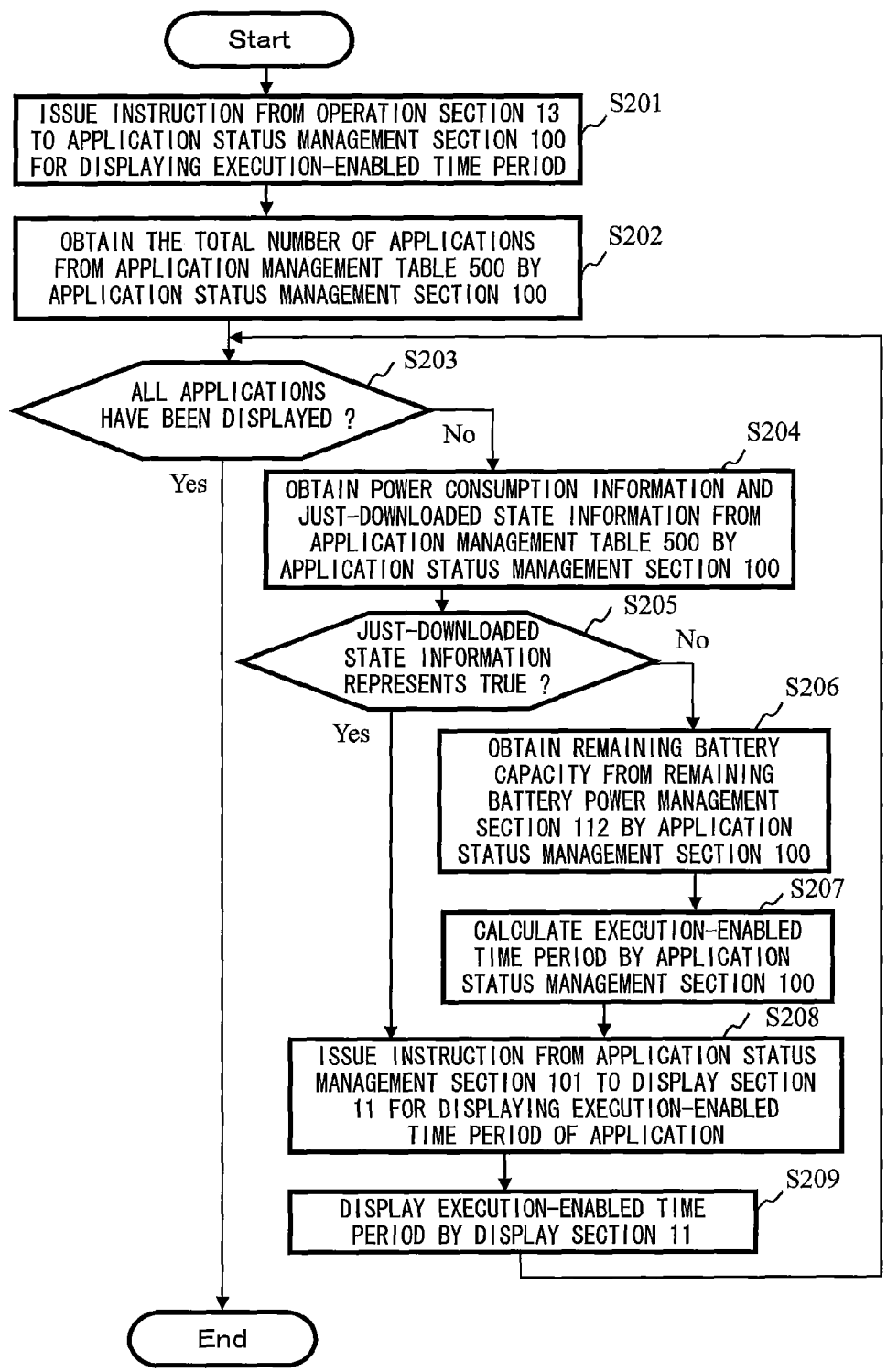
FIG. 7 illustrates an example of a flow chart for a process of displaying the application execution-allowable time periods according to the first embodiment of the present invention.

Next, a function of the portable information processing terminal 10 of the present invention for displaying the execution-enabled time period for an application on, the display section 11 will be described with reference to FIG. 5, FIG. 6, and FIG. 7.

Figure 5:
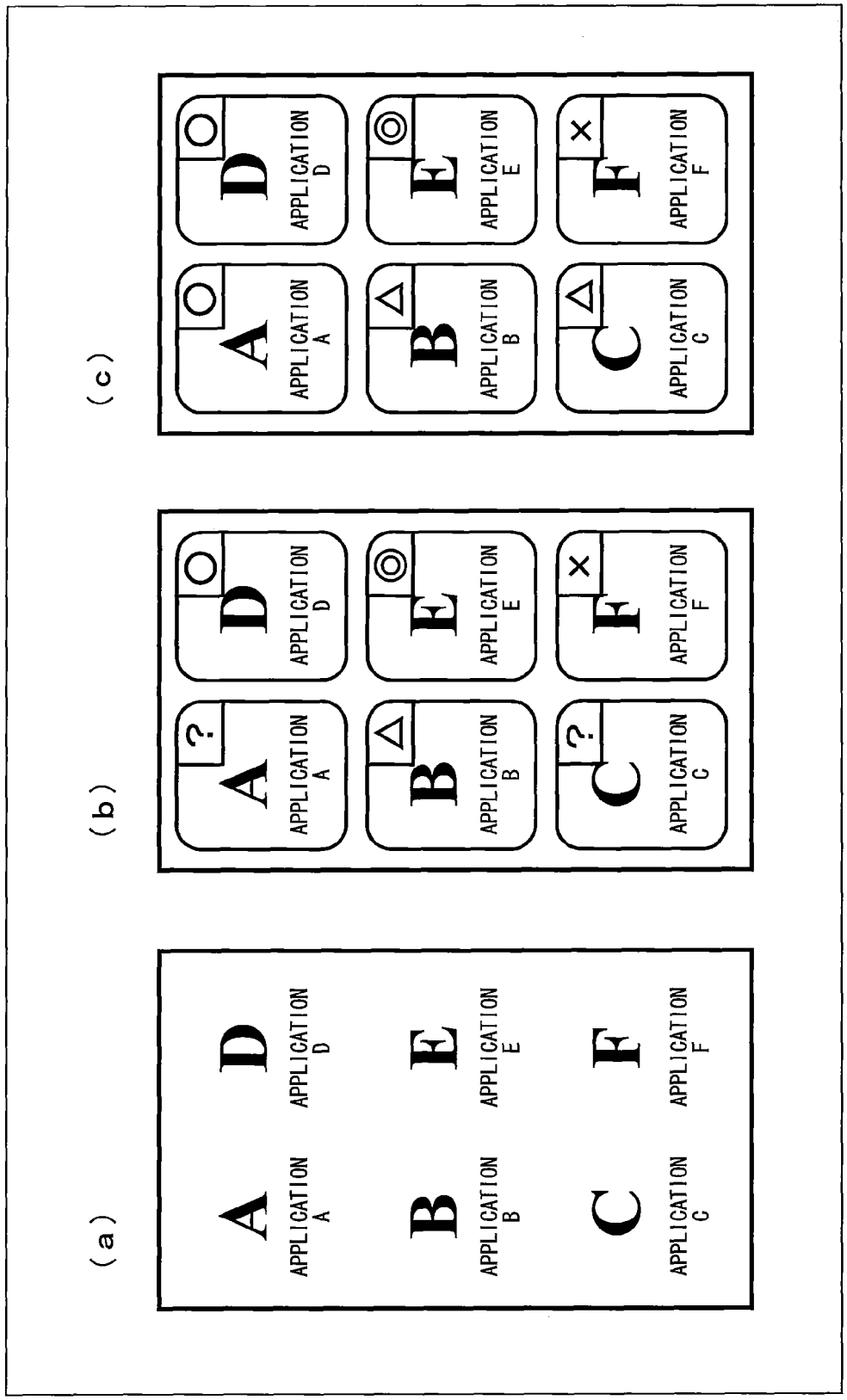
FIG. 5 illustrates an exemplary display of a list of applications.

FIG. 5 illustrates exemplary display contents indicated when a list of applications is displayed on the display section 11. FIG. 5(a) illustrates exemplary display contents indicated when the list of applications is displayed. FIG. 5(b) and FIG. 5(c) each illustrate exemplary display contents indicated when the execution-enabled time periods are displayed on the list of applications.

FIG. 6 illustrates an exemplary indication of the execution-enabled time periods for the applications. Based on the exemplary indication shown in FIG. 6, the execution-enabled time periods shown in FIG. 5(b) and FIG. 5(c) are displayed by using indication marks. Specifically, FIG. 5(b) shows an exemplary case where applications having been just downloaded are contained. FIG. 5(c) shows an exemplary case where the power consumption information of the applications having been just downloaded in FIG. 5(b) has been obtained, and the execution-enabled time periods for all the applications can be displayed.

Next, a process of allowing a user to perform, when the list of applications is displayed as shown in FIG. 5(a), an operation for executing display of the execution-enabled time periods on the list of the applications as shown in FIG. 5(b) and FIG. 5(c), will be described with reference to a flow chart shown in FIG. 7. As shown in FIG. 7, an instruction for displaying the execution-enabled time periods for the applications is transmitted from the operation section 13 to the application status management section 100 (step S201).

When receiving the instruction, the application status management section 100 obtains information representing the total number of the applications, from the application management table 500 (step S202), and repeatedly displays the execution-enabled time period for the application for the number of times corresponding to the number of applications (step S203).

Display of the execution-enabled time period for each application will be described. The application status management section 100 obtains, from the application management table 500, the just-downloaded state information and the power consumption information of the applications (step S204). When the just-downloaded state information represents TRUE (diverging from step S205 as Yes), the application status management section 100 notifies the display section 11 that the application has been just downloaded (step S208), and the display section 11 indicates that the application has been just downloaded (step S209).

On the other hand, when the just-downloaded state information obtained by the application status management section 100 represents FALSE (diverging from step S205 as No), the application status management section 100 obtains a value of a remaining battery capacity (an obtained value is represented as C0) from the remaining battery power management section 112 (step S206). Next, the application status management section 100 divides, based on the power consumption information (an obtained value is represented as W0) having been obtained, C0 representing the remaining battery capacity by W0 representing the power consumption information (C0/W0), to calculate the execution-enabled time period for the corresponding application (step S207). The application status management section 100 notifies the display section 11 of the execution-enabled time period having been calculated (step S208), and the display section 11 performs display according thereto (step S209).

<Process Performed when Connection to Battery Charger Occurs>

Subsequently, a process of obtaining the power consumption information for an application having been just downloaded, will be described with reference to FIG. 8, FIG. 9, and FIG. 10. In the present embodiment, while the portable information processing terminal 10 is connected to the battery charger, this process is performed, and hereinafter the description will be given based on a state in which the connection to the battery charger occurs.

Figure 8:
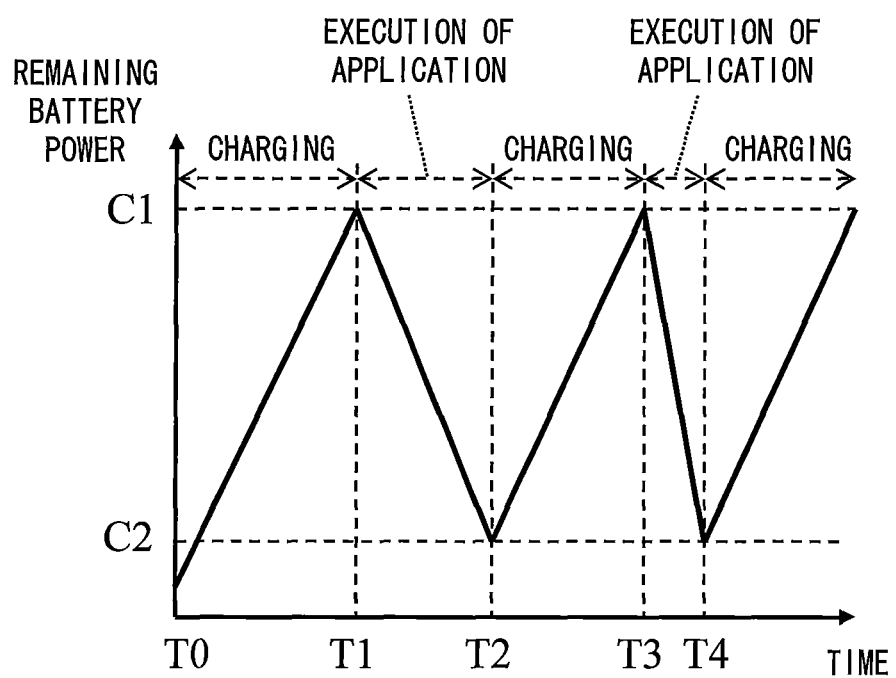
FIG. 8 illustrates an exemplary transition of a remaining battery power measured when connection to a battery charger occurs, according to the first embodiment of the present invention.

FIG. 8 illustrates an exemplary transition of a remaining battery power measured when connection to the battery charger occurs. In FIG. 8, while connection to the battery charger occurs (a time period from a time T0 to a time T1 in FIG. 8), the remaining battery power of the battery section 15 continues to increase. When the remaining battery power becomes greater than or equal to a first predetermined value C1 (the time T1 in FIG. 8), the charging operation is temporarily stopped, and an application having been just downloaded is executed. Until the remaining battery power reaches a second predetermined value C2 (a time period from the time T1 to a time T2 in FIG. 8), the application is executed. When the remaining battery power indicates the second predetermined value C2 (the time T2 in FIG. 8), the execution of the application is stopped, and charging operation is restarted.

A difference in battery capacity (which is almost equivalent to a difference between C1 and C2) is divided by a time (the time period from the time T1 to the time T2 in FIG. 8), thereby enabling calculation of a power consumption for the application per unit time. Thereafter, the portable information processing terminal 10 repeatedly performs the charging operation until the battery capacity reaches C1, and performs the execution of an application until the battery capacity reaches C2, for all the applications having been just downloaded.

Hereinafter, the process described above will be described in detail with reference to FIG. 9 and FIG. 10.

Figure 9:
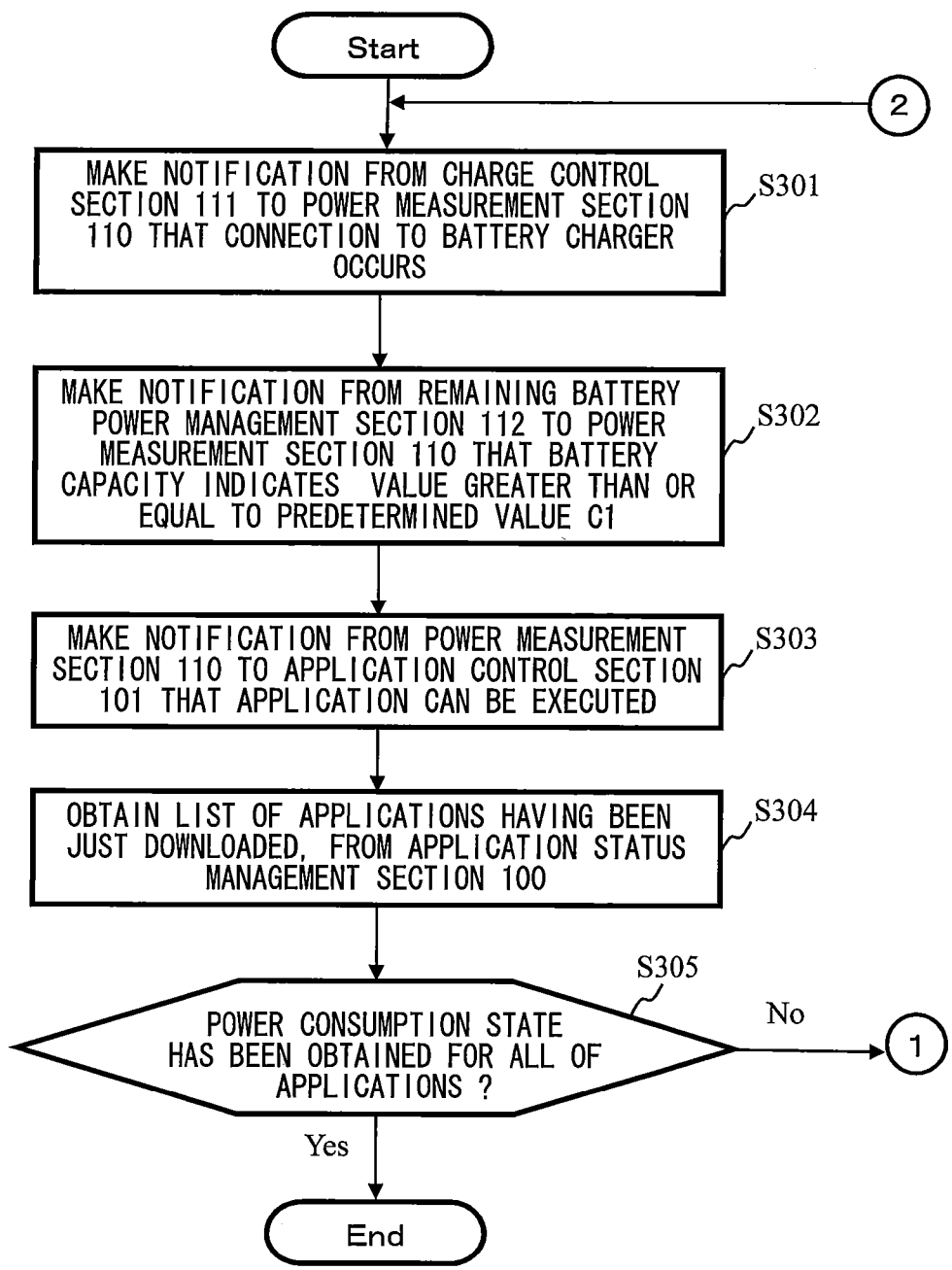
FIG. 9 illustrates an example of a flow chart for a process performed when connection to a battery charger occurs, according to the first embodiment of the present invention.
Figure 10:
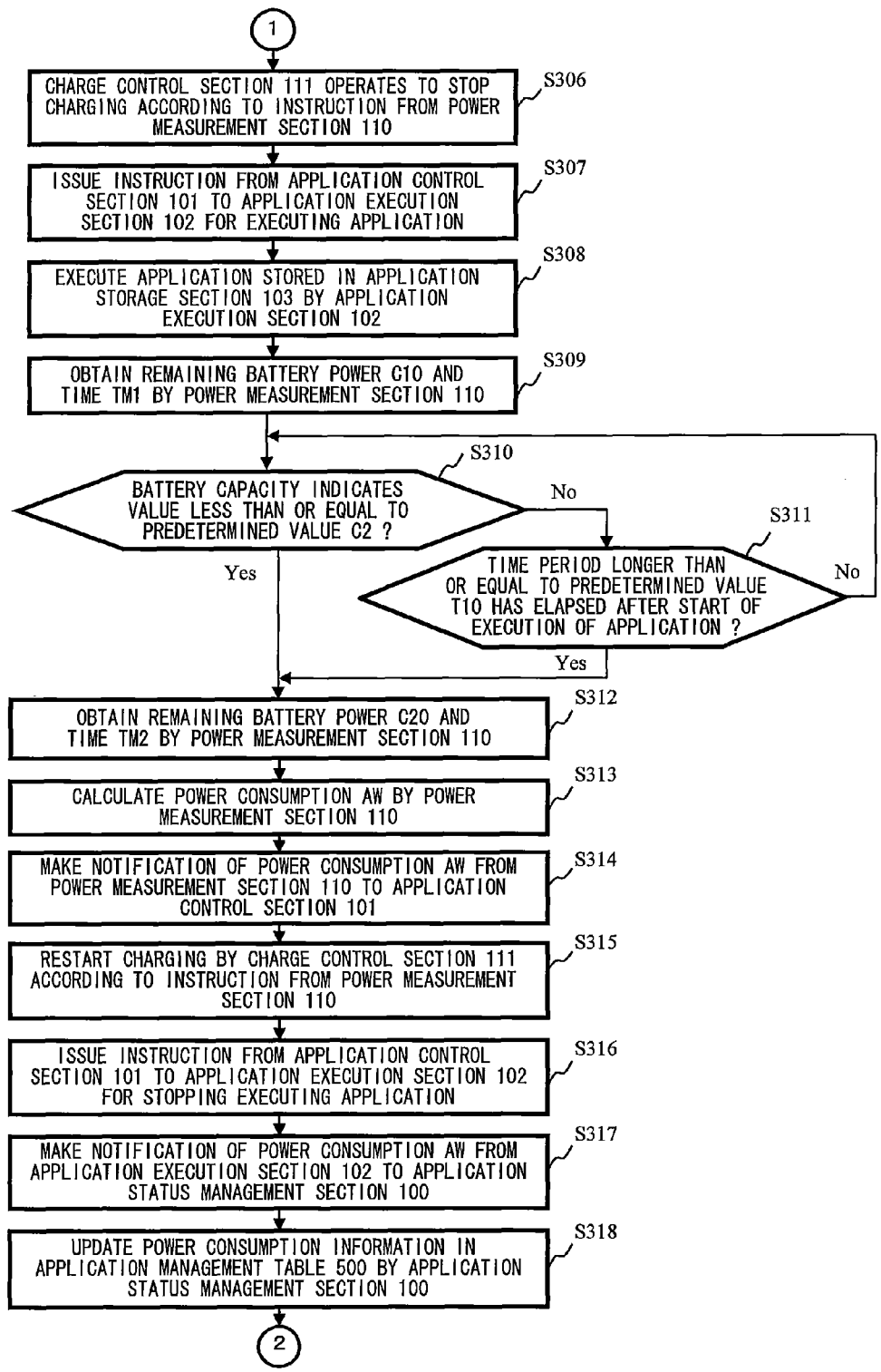
FIG. 10 illustrates an example of a flow chart for a process performed when connection to the battery charger occurs, according to the first embodiment of the present invention.

As shown in FIG. 9, when the battery charger is connected to the portable information processing terminal 10, the charge control section 111 notifies the power measurement section 110 that the connection to the battery charger occurs (step S301), and the battery section 15 starts to be charged. When the remaining battery power reaches the first predetermined value C1 by the charging operation, the remaining battery power management section 112 notifies the power measurement section 110 thereof (step S302). The power measurement section 110 notifies the application control section 101 that execution of an application can be performed for measuring a power consumption (step S303). When receiving the notification, the application control section 101 obtains, from the application status management section 100, a list of applications which have been just downloaded and for which the power consumption information for the application management table 500 has not been obtained (step S304). Thereafter, until the power consumption information of all the applications is obtained, the process of obtaining the power consumption information is performed for each application (step S305).

Next, the process of obtaining the power consumption information for each application will be described in detail with reference to FIG. 10. As shown in FIG. 10, when the application control section 101 obtains a list of the applications having been just downloaded, the power measurement section 110 firstly instructs the charge control section 111 to stop the charging operation. When receiving the instruction for the stop, the charge control section 111 stops the charging operation (step S306). After the stop of the charging operation, the application control section 101 selects one of the applications for which the just-downloaded-states represent TRUE, from the list obtained in step S304, and notifies the application execution section 102 of the application storage location thereof, and instructs the application execution section 102 to execute the application (step S307).

When receiving this instruction, the application execution section 102 obtains the application from the application storage section 103, and executes the application (step S308). Next, when the power measurement section 110 has confirmed, through the application control section 101, that the application is executed, the power measurement section 110 obtains a value of a remaining battery power (an obtained value is represented as C10) at that moment from the remaining battery power management section 112, and obtains a time (an obtained value is represented as TM1) at that moment from the clock section 121 (step S309).

Thereafter, the application execution section 102 continues to execute the application until the remaining battery power management section 112 determines that the remaining battery power becomes less than or equal to the second predetermined value C2 (step S310) or until the clock section 121 determines that a time period longer than or equal to a predetermined value T10 has elapsed (step S311). When a result of the determination in step S310 or step S311 is affirmative, the power measurement section 110 obtains a value of a remaining battery power (an obtained value is represented as C20) at that moment from the remaining battery power management section 112, and obtains a time (an obtained value is represented as TM2) at that moment from the clock section 121 (step S312).

Next, the power measurement section 110 calculates a power consumption AW for the application per unit time by using (equation 1) (step S313), and notifies the application control section 101 of the power consumption (step S314). Thereafter, the power measurement section 110 instructs the charge control section 111 to restart the charging operation (step S315). The application control section 101 instructs the application execution section 102 to end the execution of the application (step S316). When the application control section 101 has confirmed that the execution of the application is ended, the application control section 101 notifies the application status management section 100 of the power consumption AW for the application (step S317). When receiving the notification, the application status management section 100 updates the application management table 500 (step S318). Specifically, the application status management section 100 sets FALSE to the just-downloaded state information of the corresponding application, and sets a value of AW to the power consumption information of the application.

$$AW = \frac{C10 - C20}{TM2 - TM1} \qquad \text{[Equation 1]}$$

The clock section 121 determines in step S311 that a time period longer than or equal to the predetermined value T10 has elapsed because, even in a case where an application having a small power consumption is executed, and the remaining battery power does not become less than or equal to the second predetermined value C2, it can be determined, when a time period longer than or equal to the predetermined value T10 has elapsed, that calculation of the power consumption AW for the application is enabled.

<Process for Stopping Execution of Application>

Figure 11:
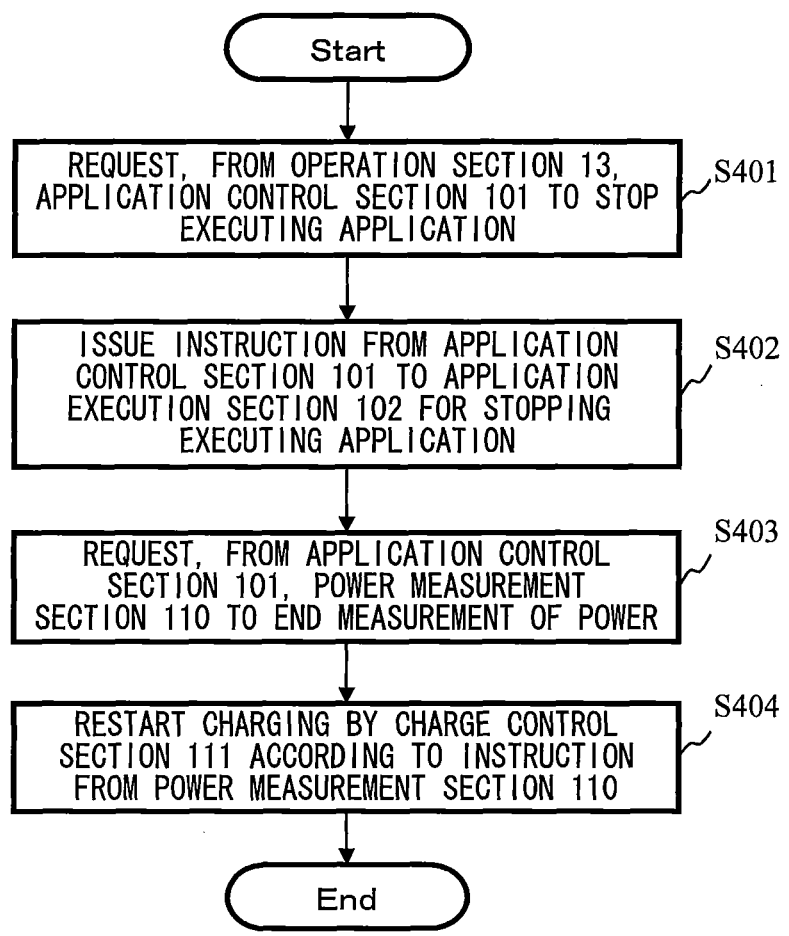
FIG. 11 illustrates an example of a flow chart for a process performed when an operation is performed by a user in the case of connection to the battery charger occurring, according to the first embodiment of the present invention.

The process of executing an application while connection to the battery charger occurs as described above is likely to be stopped halfway due to an operation performed by a user or cancellation of the connection to the battery charger. A process for such a case will be described with reference to FIG. 11. In FIG. 11, in particular, a case is described in which the process is stopped due to an operation performed by a user. However, also when the process is stopped due to any trigger such as cancellation of the connection to the battery charger, a similar process is performed.

When an operation is performed by a user, the operation section 13 firstly requests the application control section 101 to end the execution of the application (step S401). When receiving this request, the application control section 101 requests the application execution section 102 to stop the execution of the application (step S402), and requests the power measurement section 110 to end the measurement of power (step S403). Finally, when the connection to the battery charger occurs, the power measurement section 110 requests the charge control section 111 to restart the charging operation (step S404). Thus, a process based on an operation performed by a user can be executed.

As described above, in the portable information processing terminal 10 according to the first embodiment of the present invention, when connection to the battery charger occurs, the application control section 101 executes an application for which the power consumption information per unit time has not been obtained, according to a notification from the application status management section 100, and the power measurement section 110 measures s power consumption, per unit time, for the application being executed, so that the power consumption, per unit time, for the application for which the power consumption information has not been obtained can be measured while connection to the battery charger occurs. Thus, before a user explicitly operates to execute an unspecified application, the execution-enabled time period for the application can be obtained.

(Second Embodiment)

Next, a portable information processing terminal 20 according to a second embodiment will be described. In the first embodiment, while an application is being executed for measuring a power consumption, charging operation using the battery charger is temporarily stopped. The portable information processing terminal 20 according to the second embodiment does not stop the charging operation while the application is being executed for measuring a power consumption.

<Configuration of Portable Information Processing Terminal 20>

Figure 12:
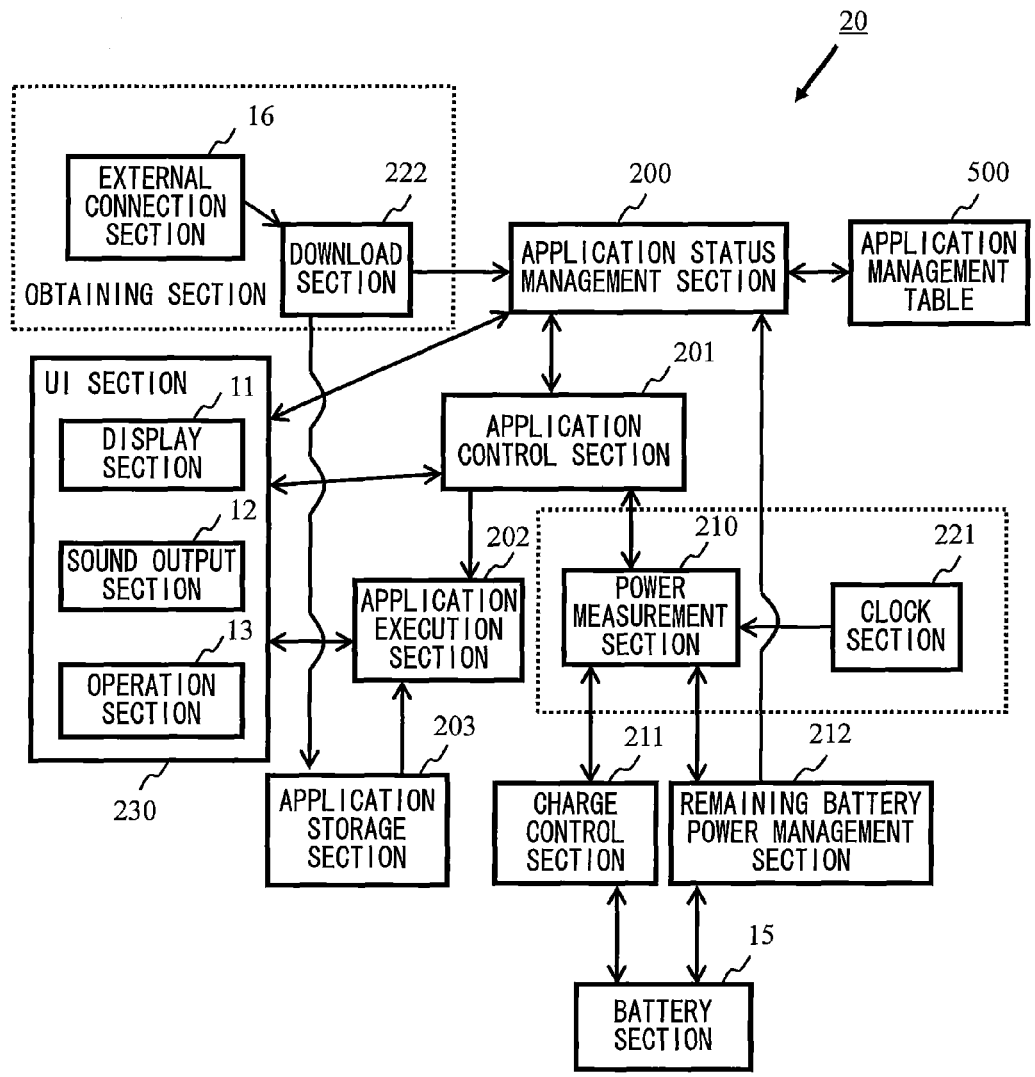
FIG. 12 is a block diagram illustrating an exemplary configuration of a portable information processing terminal 20 according to a second embodiment of the present invention.

FIG. 12 is a block diagram illustrating an exemplary configuration of the portable information processing terminal 20 according to the second embodiment of the present invention. As shown in FIG. 12, the portable information processing terminal 20 according to the second embodiment includes the battery section 15, the external connection section 16, an application status management section 200, an application control section 201, an application execution section 202, an application storage section 203, a power measurement section 210, a charge control section 211, a remaining battery power management section 212, a clock section 221, a download section 222, a UI section 230, the application management table 500, and the like.

In FIG. 12, the application status management section 200, the application control section 201, the application execution section 202, the application storage section 203, the clock section 221, the download section 222, and the UI section 230 have functions equivalent to those of the application status management section 100, the application control section 101, the application execution section 102, the application storage section 103, the clock section 121, the download section 122, and the UI section 130, respectively, which are described in the first embodiment, and the description thereof is not given.

The power measurement section 210 measures a power consumption, per unit time, for an application being executed. The power measurement section 210 measures a power consumption according to a notification that execution of the application is started and the execution of the application is stopped being received from the application control section 201. The power measurement section 210 obtains, from the charge control section 211, a value of a battery capacity of power having been stored by the charging operation while the application is being executed, and obtains, from the remaining battery power management section 212, a value of a remaining battery power measured at each of the time at which the execution of the application is started and the time at which the execution of the application is stopped, thereby calculating a power consumption for the application. Further, the power measurement section 210 obtains, from the clock section 221, the time at which the execution of the application is started, and the time at which the execution of the application is stopped, thereby measuring s power consumption per unit time.

The charge control section 211 measures an amount of power stored while the battery section 15 is charged according to an instruction from the power measurement section 210. In general, the charging operation is performed with a charge voltage and a charge current being managed and controlled for the charging operation, and therefore an amount of power stored by the charging operation during a specified time period can be measured. The remaining battery power management section 212 obtains a value of a remaining capacity of the battery section 15. The remaining battery power management section 212 notifies the power measurement section 210 and the application status management section 200 of the remaining battery power of the battery section 15.

<Process Performed when Connection to Battery Charger Occurs>

Subsequently, a process of obtaining, in the portable information processing terminal 20 according to the second embodiment of the present invention, the power consumption information of an application having been just downloaded, will be described with reference to FIG. 13, FIG. 14, and FIG. 15. In the present invention, while the portable information processing terminal 20 is connected to the battery charger, a process of obtaining the power consumption information is performed, and hereinafter description will be given based on a state in which connection to the battery charger occurs.

Figure 13:
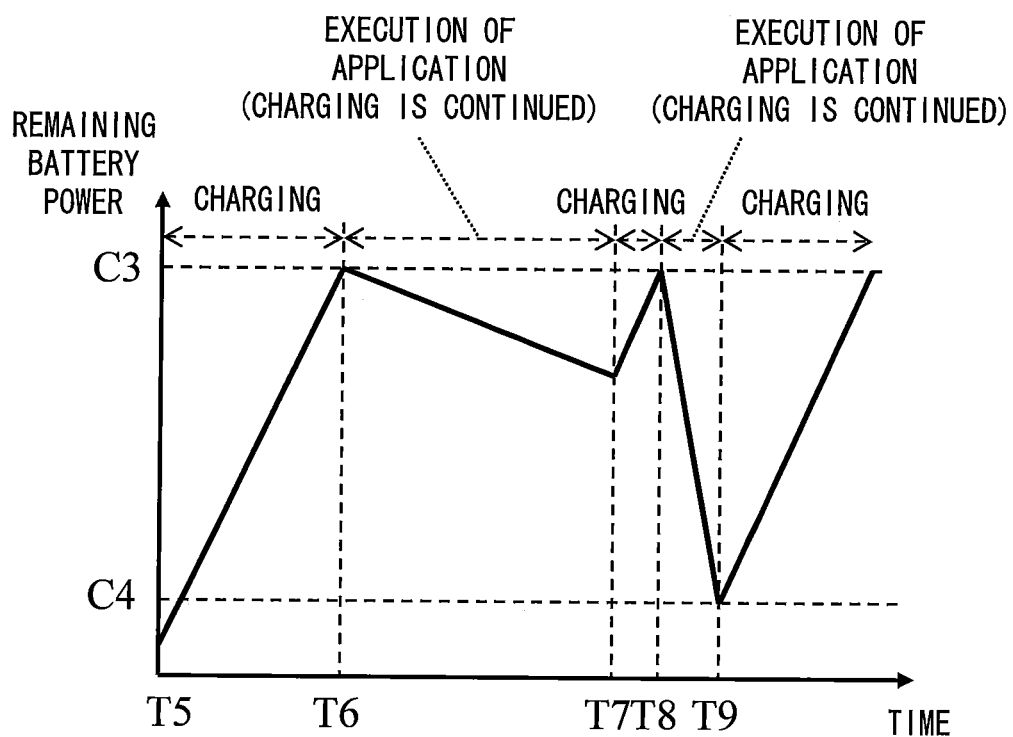
FIG. 13 illustrates an exemplary transition of a remaining battery power measured when connection to a battery charger occurs, according to the second embodiment of the present invention.

FIG. 13 illustrates an exemplary transition of a remaining battery power measured when the portable information processing terminal 20 according to the second embodiment of the present invention is connected to the battery charger. In FIG. 13, while connection to the battery charger occurs (a time period from a time T5 to a time T6 in FIG. 13), the remaining battery power of the battery section 15 continues to increase. When the remaining battery power becomes greater than or equal to a first predetermined value C3 (the time T6 in FIG. 13), an application having been just downloaded is executed. Until a time period longer than or equal to a predetermined time period elapses (from the time T6 to a time T7 in FIG. 13) or until the remaining battery power becomes lower than or equal to a second predetermined value C4, the application is executed in a state where the charging operation is continued.

In FIG. 13, at the time T7 at which a time period longer than or equal to the predetermined time period has elapsed, the execution of the application is stopped. Based on a difference between a battery capacity at the time T6 and a battery capacity at the time T7, and a battery capacity of power having been stored by the charging operation during a time period from the time T6 to the time T7, a power consumption is calculated, and a value of the calculated power consumption is divided by a time (a time period from the time T6 to the time T7), to calculate a power consumption for the application per unit time. Thereafter, for all the applications having been just downloaded, the charging operation only performed until the battery capacity becomes C3, and the execution of an application performed, with the charging operation being continued, until a time period longer than or equal to a predetermined time period has elapsed, or until the battery capacity becomes less than or equal to C4, are repeatedly performed.

Hereinafter, the process described above will be described in detail with reference to FIG. 14 and FIG. 15.

Figure 14:
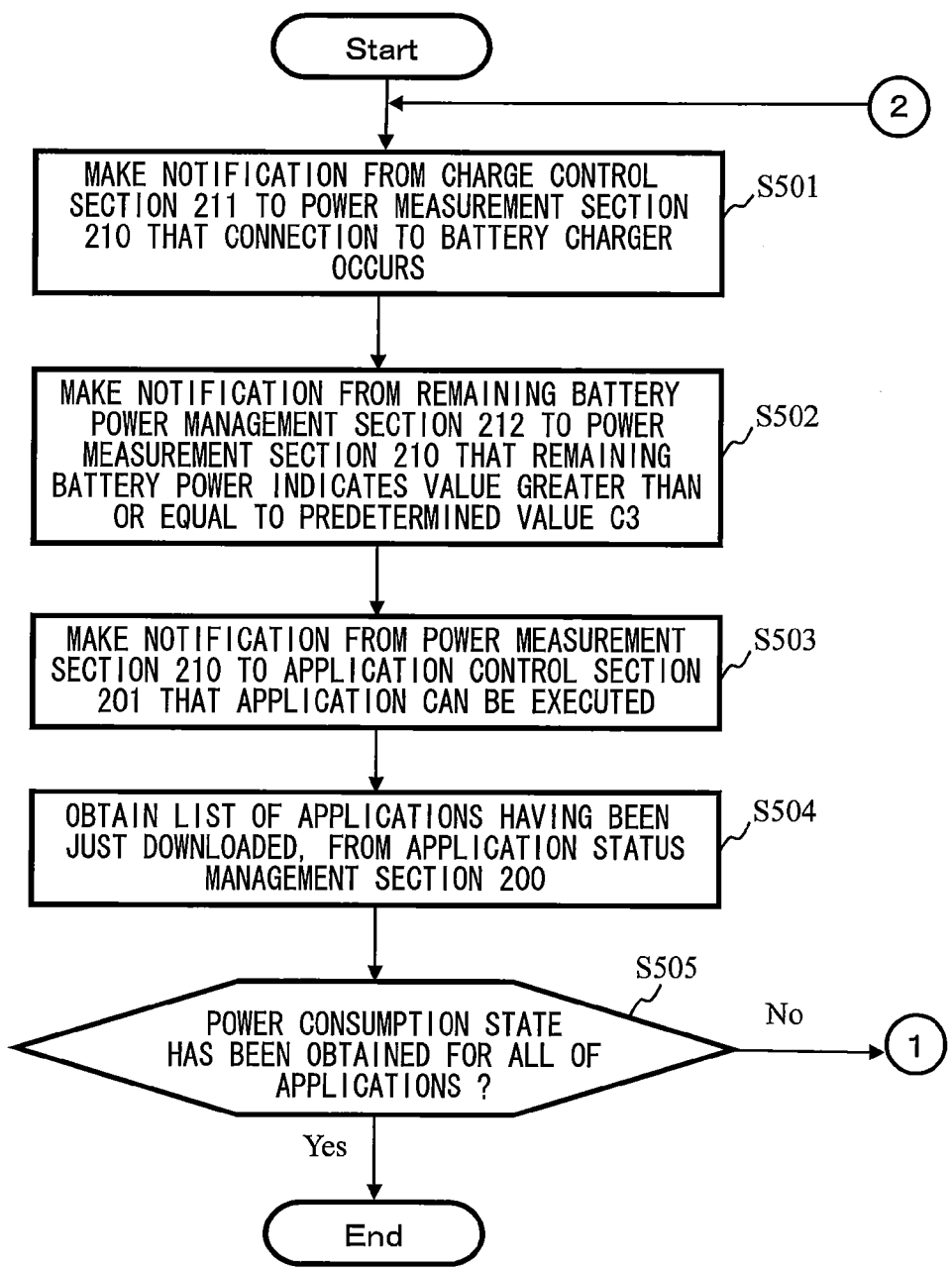
FIG. 14 illustrates an example of a flow chart for a process performed when the connection to the battery charger occurs, according to the second embodiment of the present invention.
Figure 15:
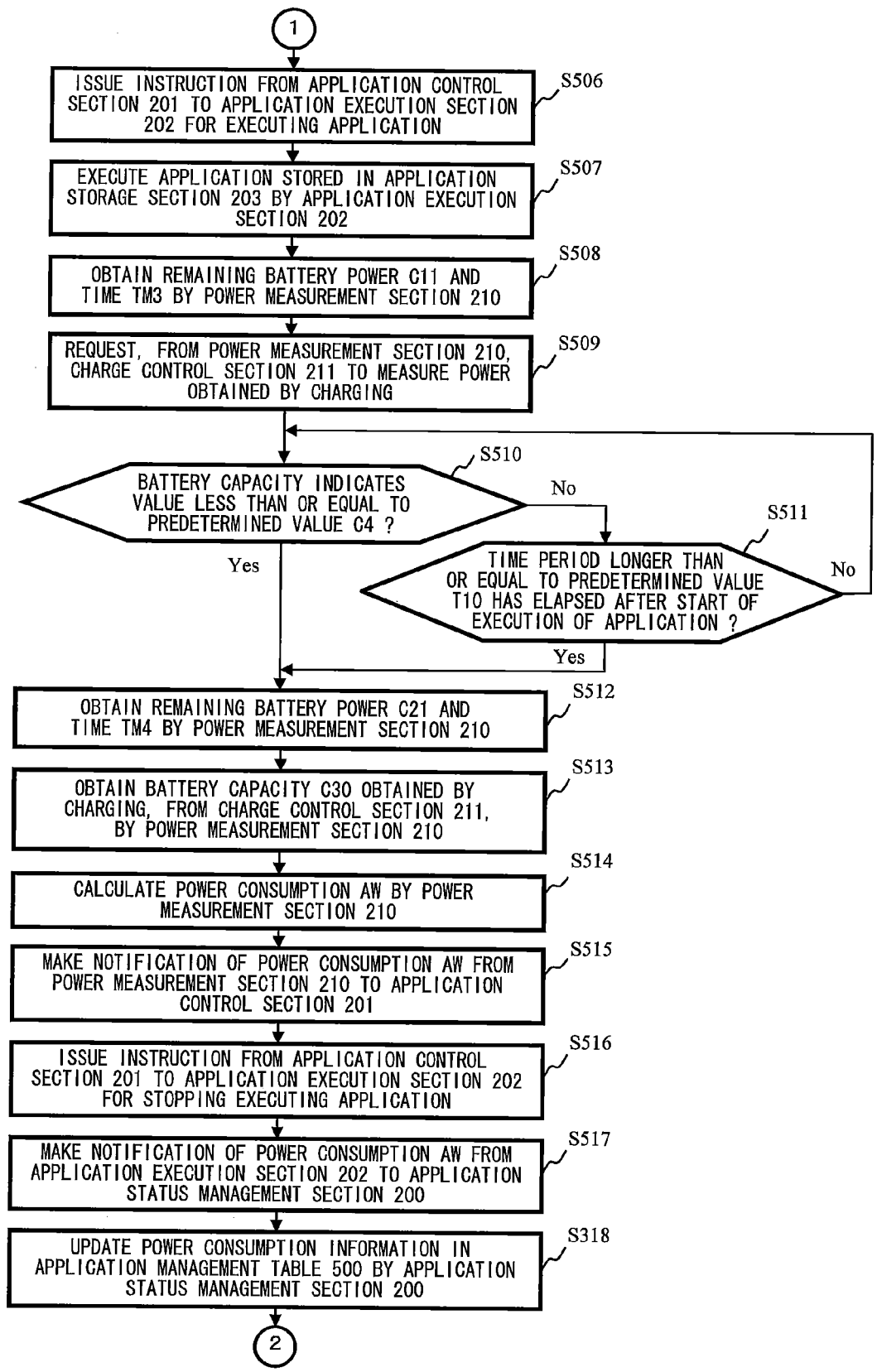
FIG. 15 illustrates an example of a flow chart for a process performed when the connection to the battery charger occurs, according to the second embodiment of the present invention.

As shown in FIG. 14, when the battery charger is connected to the portable information processing terminal 20, the charge control section 211 notifies the power measurement section 210 that connection to the battery charger occurs (step S501), and the battery section 15 starts to be charged. When the remaining battery power reaches the first predetermined value C3 by the charging operation, the remaining battery power management section 212 notifies the power measurement section 210 thereof (step S502). The power measurement section 210 notifies the application control section 201 that execution of the application can be performed for measuring a power consumption (step S503). When receiving the notification, the application control section 201 obtains, from the application status management section 200, a list of applications which have been just downloaded and for which the power consumption information for the application management table 500 has not been obtained (step S504). Thereafter, until the power consumption information of all the applications is obtained, the portable information processing terminal 20 performs the process of obtaining the power consumption information for each application (step S505).

Next, the process of obtaining the power consumption information for each application will be described in detail with reference to FIG. 15. As shown in FIG. 15, firstly, the application control section 201 selects one of the applications for which the just-downloaded-states represent TRUE, from the list obtained in step S504, and notifies the application execution section 202 of the application storage location, and instructs the application execution section 202 to execute the application (step S506). When receiving the instruction, the application execution section 202 obtains the application from the application storage section 203, and executes the application (step S507).

Next, when the power measurement section 210 has confirmed, through the application control section 201, that the application is executed, the power measurement section 210 obtains a value of a remaining battery power (an obtained value is represented as C11) at that moment from the remaining battery power management section 212, obtains a time (an obtained value is represented as TM3) at that moment from the clock section 221 (step S508), and requires the charge control section 211 to measure a power stored during the charging operation (step S509).

Thereafter, until the remaining battery power management section 212 determines that the remaining battery power becomes less than or equal to the second predetermined value C4 (step S510) or until the clock section 221 determines that a time period longer than or equal to a predetermined value T10 has elapsed (step S511), the execution of the application is continued. When a result of the determination in step S510 or step S511 is affirmative, the power measurement section 210 obtains a value of a remaining battery power (an obtained value is represented as C21) at that moment from the remaining battery power management section 212, and obtains a time (an obtained value is represented as TM4) at that moment from the clock section 121 (step S512). Thereafter, the power measurement section 210 obtains, from the charge control section 211, a value of a battery capacity (an obtained value is represented as C30) of power stored by the charging operation (step S513). At that time, the power measurement section 210 also notifies the charge control section 211 that the measurement of power stored by the charging operation is to be ended.

Next, the power measurement section 210 calculates a power consumption AW for the application per unit time by using (equation 2) (step S514), and notifies the application control section 201 of the power consumption (step S515). Thereafter, the application control section 201 instructs the application execution section 202 to end the execution of the application (step S516). When it has been confirmed that the execution of the application is ended, the application control section 201 notifies the application status management section 200 of the power consumption AW for the application (step S517). When receiving the notification, the application status management section 100 updates the application management table 500 (step S518). Specifically, FALSE is set to the just-downloaded state information of the corresponding application, and a value of AW is set to the power consumption information of the application.

$$AW = \frac{C11 + C30 - C21}{TM4 - TM3} \quad \text{[Equation 2]}$$

<Process for Stopping Execution of Application>

The process of executing an application while connection to the battery charger occurs as described above is likely to be stopped halfway due to an operation performed by a user or cancellation of the connection to the battery charger. A process for such a case will be described with reference to FIG. 16. In FIG. 16, in particular, a case is described in which the process is stopped due to an operation performed by a user. However, also when the process is stopped due to any trigger such as cancellation of connection to the battery charger, a similar process is performed.

As shown in FIG. 16, when an operation is performed by a user, the operation section 13 firstly requests the application control section 201 to end the execution of the application (step S601). When receiving this request, the application control section 201 requests the application execution section 202 to stop the execution of the application (step S602), and requests the power measurement section 210 to end the measurement of power (step S603). Thus, a subsequent process based on the operation performed by the user can be executed.

As described above, in the portable information processing terminal 20 according to the second embodiment of the present invention, when connection to the battery charger occurs, the application control section 201 executes an application for which the power consumption information per unit time has not been obtained, according to a notification from the application status management section 200, and the power measurement section 210 measures a power consumption, per unit time, for the application being executed, so that the power consumption, per unit time, for the application for which the power consumption information has not been obtained can be measured while connection to the battery charger occurs. Thus, before a user explicitly operates to execute an unspecified application, the execution-enabled time period for the application can be obtained. Further, since the charging operation is not stopped also while the application is being executed, the charge time period can be reduced.

(Third Embodiment)

Next, a portable information processing terminal 30 according to a third embodiment will be described. In the first embodiment and the second embodiment, a screen display and a sound output are performed according to the execution of the application, in order to obtain the power consumption information. On the other hand, the portable information processing terminal 30 according to the third embodiment does not perform the screen display and the sound output when an application is executed in order to obtain the power consumption information.

<Configuration of Portable Information Processing Terminal 30>

FIG. 17 is a block diagram illustrating an exemplary configuration of the portable information processing terminal 30 according to the third embodiment of the present invention. In FIG. 17, the portable information processing terminal 30 according to the third embodiment includes the battery section 15, the external connection section 16, an application status management section 300, an application control section 301, an application execution section 302, an application storage section 303, a power measurement section 310, a charge control section 311, a remaining battery power management section 312, a clock section 321, a download section 322, a UI section 330, the application management table 500, and the like.

In FIG. 17, the application status management section 300, the application execution section 302, the application storage section 303, the charge control section 311, the remaining battery power management section 312, the clock section 321, the download section 322 have functions equivalent to those of the application status management section 100, the application execution section 102, the application storage section 103, the charge control section 111, the remaining battery power management section 112, the clock section 121, and the download section 122, respectively, which are shown in FIG. 2, and the description thereof is not given.

The application control section 301 controls execution of an application. The application control section 301 obtains, from the application status management section 300, information of an application to be executed, and notifies the application execution section 302 of the application storage location and the like, thereby executing the application. Further, the application control section 301 notifies the power measurement section 310 that execution of the application is started and the execution of the application is ended, in order to obtain the power consumption information for the application per unit time. Further, the application control section 301 according to the third embodiment notifies the UI section 330 of the start and the end of the execution of the application for obtaining the power consumption information since a display and a sound output are not performed while the application is being executed for obtaining the power consumption information.

The power measurement section 310 measures a power consumption, per unit for an application being executed. When receiving, from the application control section 301, a notification that the execution of the application is started and a notification that the execution of the application is stopped, the power measurement section 310 measures a power consumption. The power measurement section 110 instructs the charge control section 311 to stop a charging operation before the application is executed, obtains, from the remaining battery power management section 312, a value of a remaining battery power measured at each of a time a which the execution of the application is started, and a time at which the execution of the application is stopped, and calculates the difference, thereby calculating a power consumption for the application. Further, the power measurement section 310 obtains, from the clock section 321, a time at which the execution of the application is started, and a time at which the execution of the application is stopped, thereby measuring a power consumption per unit time. Further, the power measurement section 310 according to the third embodiment holds therein power consumption data of each of the display section 11 and the sound output section 12. The power consumption data is practical data representing a value of power that enables power used in the display section 11 to be calculated based on an operation status (the number of times a display is updated, a display image size, and the like) of the display section 11, and practical data representing a value of power that enables power used in the sound output section 12 to be calculated based on an operation status (transmission size of sound data, the number of times the sound data is transmitted, and the like) of the sound output section 12.

<Configuration of UI Section 330>

FIG. 18 shows an exemplary configuration of the UI section 330 according to the third embodiment of the present invention. In FIG. 18, the UI section 330 includes the display section 11, the sound output section 12, the operation section 13, an IF (Interface) section 331, a UI control section 332, an operation mode management section 333, a pseudo operation section 334, and the like.

The UI section 330 according to the third embodiment implements two operation modes, that is, a normal operation mode and a pseudo operation mode, and the two operation modes represent different operations, respectively. In the normal operation mode, the UI section 330 performs a screen display on the display section 11, and a sound output from the sound output section 12, according to an instruction from each component. On the other hand, in the pseudo operation mode, the UI section 330 does not perform the screen display and the sound output even when an instruction is issued from each component. Although the UI section 330 receives, from each component, a request for a screen display on the display section 11, and a request for a sound output from the sound output section 12, the UI section 330 does not perform the screen display and the sound output at that moment, and makes, at an appropriate time, a response equivalent to that as made in the normal mode.

The IF section 331 receives, from the application status management section 300, the application control section 301, and the application execution section 302, requests for screen display and/or sound output. The IF section 331 notifies the application status management section 300, the application control section 301, and the application execution section 302 of contents of an operation performed by a user. The IF section 331 notifies the UI control section 332 of a request from each component in the normal operation mode, and notifies the pseudo operation section 334 of a request from each component in the pseudo operation mode. Further, when receiving operation information, of the operation section 13 via the UI control section 332, the IF section 331 notifies each component of the operation contents in either mode.

The UI control section 332 controls the display section 11, the sound output section 12, and the operation section 13. The UI control section 332 controls, based on a request obtained from the IF section 331, the display section 11 and the sound output section 12 so as to perform a screen display and a sound output. Further, when receiving, from the operation section 13, an operation performed by a user, the UI control section 332 notifies the IF section 331 of the operation contents.

The operation mode management section 333 manages an operation mode of the UI section 330. The operation mode management section 333 receives an instruction for an operation mode from the application control section 301, and indicates to the IF section 331 whether operation is to be performed in the normal operation mode or the pseudo operation mode.

The pseudo operation section 334 acts for an operation of the UI section 330 when the pseudo operation mode is executed. The pseudo operation section 334 receives, from the IF section 331, a request to be normally issued to the display section 11 or the sound output section 12, and returns, to the IF section 331, a response according to the received request. The request to be issued to the display section 11 or the sound output section 12 is, for example, a request for performing a display by using screen data, or a request for performing a sound output by using sound data. In response to the request, the pseudo operation section 334 returns a response to the IF section 331 according to a time appropriate to a component that has made the request. For example, when a response is needed at a time when the display of the screen data is ended, a response is made, by using an internal timer, at a time at which the display of the screen data is estimated to end.

Further, the pseudo operation section 334 stores, according to a request from the power measurement section 310, a state of an operation (the number of times a display is updated, the display image size, and the like) which is required of the display section 11 when the pseudo operation mode is executed, and a state of an operation (transmission size of sound data, the number of times the sound data is transmitted, and the like) which is required of the sound output section 12 when the pseudo operation mode is executed. The power measurement section 310 calculates, based on the information, a power estimated to be consumed by the display section 11 and the sound output section 12.

In the configuration described above, the UI section 330 receives a request issued to the IF section 331 from each component, and controls the display section 11 and the sound output section 12 in the normal operation mode, and merely makes a response by using the pseudo operation section 334 in pseudo operation mode.

<Process Performed when Connection to Battery Charger Occurs>

Subsequently, a process of obtaining the power consumption information of an application having been just downloaded according to the third embodiment of the present invention, will be described with reference to FIG. 19 and FIG. 20. In the present invention, while the portable information processing terminal 30 is connected to the battery charger, this process is performed, and hereinafter the description will be given based on a state in which the to the battery charger occurs.

Figure 19:
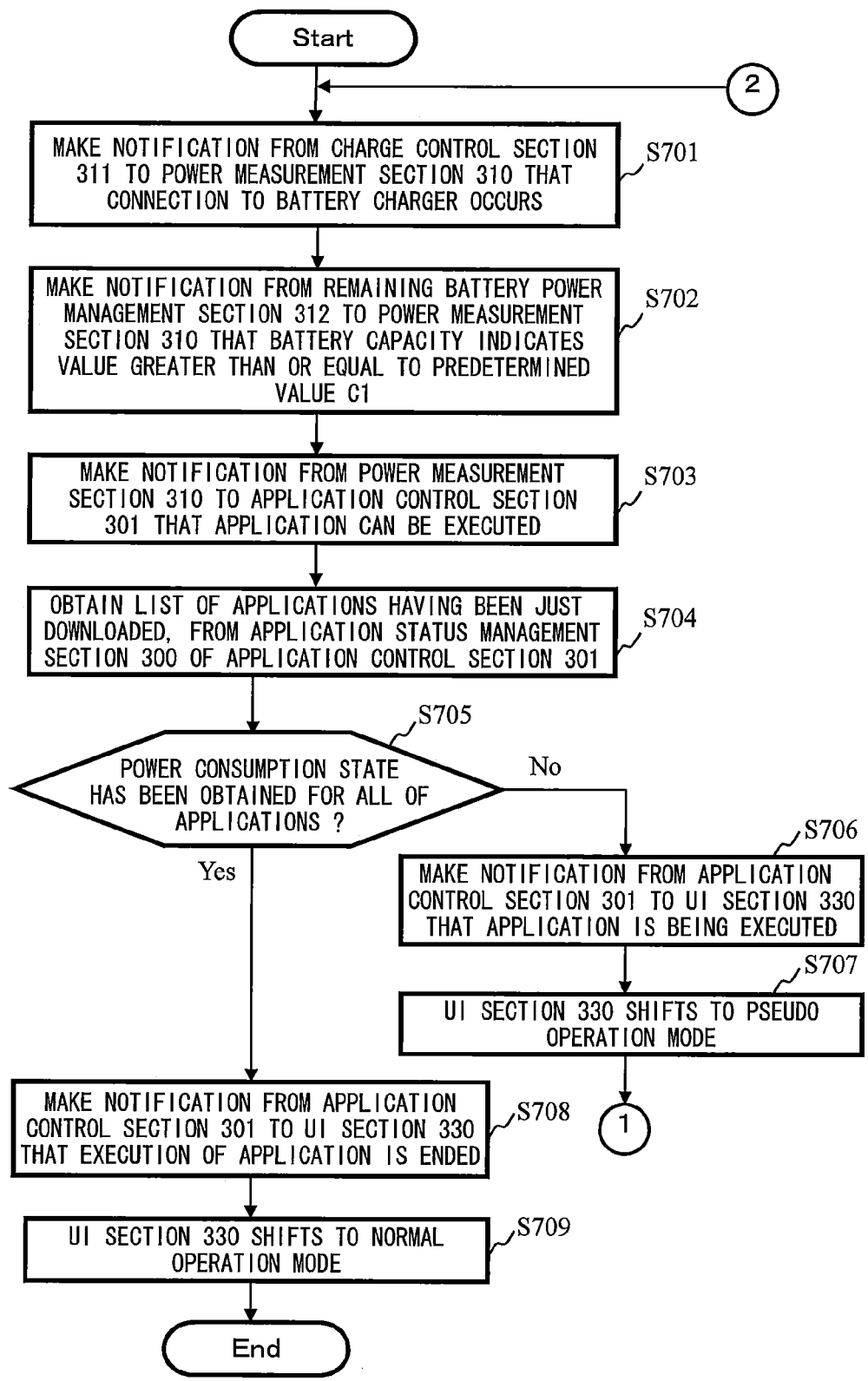
FIG. 19 illustrates an example of a flow chart for a process performed when the connection to the battery charger occurs, according to the third embodiment of the present invention.
Figure 20:
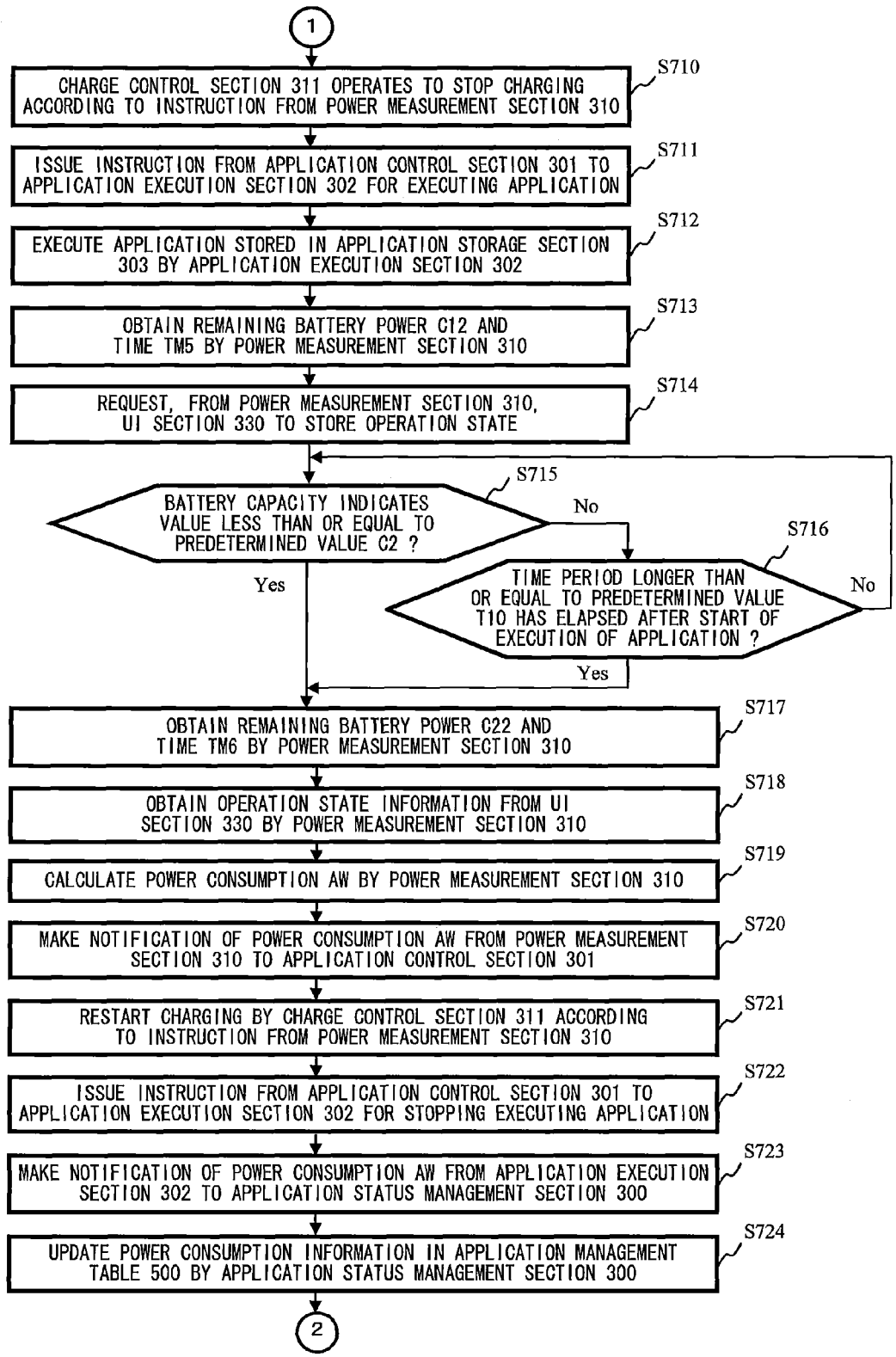
FIG. 20 illustrates an example of a flow chart for a process performed when the connection to the battery charger occurs, according to the third embodiment of the present invention.

As shown in FIG. 19, when the battery charger is connected to the portable information processing terminal 30, the charge control section 311 notifies the power measurement section 310 that the connection to the battery charger occurs (step S701), and the battery section 15 starts to be charged. When the remaining battery power reaches a first predetermined value C1 by the charging operation, the remaining battery power management section 312 notifies the power measurement section 310 thereof (step S702). The power measurement section 310 notifies the application control section 301 that execution of an application can be performed for measuring a power consumption (step S703). When receiving the notification, the application control section 301 obtains, from the application status management section 300, a list of the applications which have been just downloaded and for which the power consumption information for the application management table 500 has not been obtained (step S704). Thereafter, until the power consumption information of all the applications is obtained, the process of obtaining the power consumption information is performed for each application (step S705).

In a case where an application having been just downloaded is contained, and the process of obtaining the power consumption information is performed (diverging from step S705 as No), the application control section 301 notifies the UI section 330 that the execution of the application is started (step S706). When receiving the notification, the UI section 330 shifts to the pseudo operation mode (step S707). When an application having been just downloaded not contained, and the process of obtaining the power consumption information is not performed (diverging from step S705 as Yes), the application control section 301 notifies the UI section 330 that the execution of the application is ended (step S708). When receiving the notification, the UI section 330 shifts to the normal operation mode (step S709), to end a series of process steps.

Next, the process of obtaining the power consumption information for each application will be described in detail with reference to FIG. 20. As shown in FIG. 20, when shift to the pseudo operation mode has been performed, the power measurement section 310 firstly instructs the charge control section 311 to stop a charging operation, and the charging operation is stopped (step S710). After the stop of the charging operation, the application control section 301 selects one of the applications for which the just-downloaded-states represent TRUE, from the list obtained in step S704, and notifies the application execution section 302 of the application storage location thereof, and instructs the application execution section 302 to execute the application (step S711).

When receiving the instruction, the application execution section 302 obtains the application from the application storage section 303, and executes the application (step S712). Next, when the power measurement section 310 has confirmed, through the application control section 301, that the application is executed, the power measurement section 310 obtains, from the remaining battery power management section 312, a value of a remaining battery power (an obtained value is represented as C12) at that moment, and obtains, from the clock section 321, a time an obtained value is represented as TM5) at that moment (step S713). Further, the power measurement section 310 instructs the UI section 330 to start storing the state of the required operation (step S714).

Thereafter, until the remaining battery power management section 312 determines that the remaining battery power becomes less than or equal to a second predetermined value C2 (step S715) or until the clock section 321 determines that a time period longer than or equal to a predetermined value T10 has elapsed (step S716), the application execution section 302 continues to execute the application. When a result of the determination in step S715 or step S716 is affirmative, the power measurement section 310 obtains a value of a remaining battery power (an obtained value is represented as C22) at that moment from the remaining battery power management section 312, and obtains a time (an obtained value is represented as TM6) at that moment from the clock section 321 (step S717). Thereafter, the power measurement section 310 obtains, from the UI section 330, the operation state information for the application being executed (step S718). At that time, the power measurement section 310 also notifies the UI section 330 that the obtaining of the operation state is to be ended.

Next, the power measurement section 310 calculates a power consumption AW for the application per unit time (step S719). Specifically, the power measurement section 310 firstly obtains an estimated power consumption CV of the display section 11 and an estimated power consumption CA of the sound output section 12, according to the operation state information (estimated operation state information of the display section 11 and the sound output section 12 in the normal operation mode) which is obtained by the UI section 330 while the application is executed. A power consumption AW for the application per unit time is calculated by using (equation 3) based on the obtained values and values obtained in step S713 and step S717.

$$AW = \frac{C12 - C22 + CV + CA}{TM6 - TM5}$$ [Equation 3]

Thereafter, the power measurement section 310 notifies the application control section 301 of the power consumption AW for the application per unit time (step S720), and instructs the charge control section 311 to restart the charging operation (step S721). According to the notification made in step S720, the application control section 301 instructs the application execution section 302 to end the execution of the application (step S722). When it has been confirmed that the execution of the application is ended, the application control section 301 notifies the application status management section 300 of the power consumption AW for the application (step S723). When receiving the notification, the application status management section 300 updates the application management table 500 (step S724). Specifically, the application status management section 100 sets FALSE to the just-downloaded state information of the corresponding application, and sets a value of AW to the power consumption information of the application.

<Process for Stopping Execution of Application>

Figure 21:
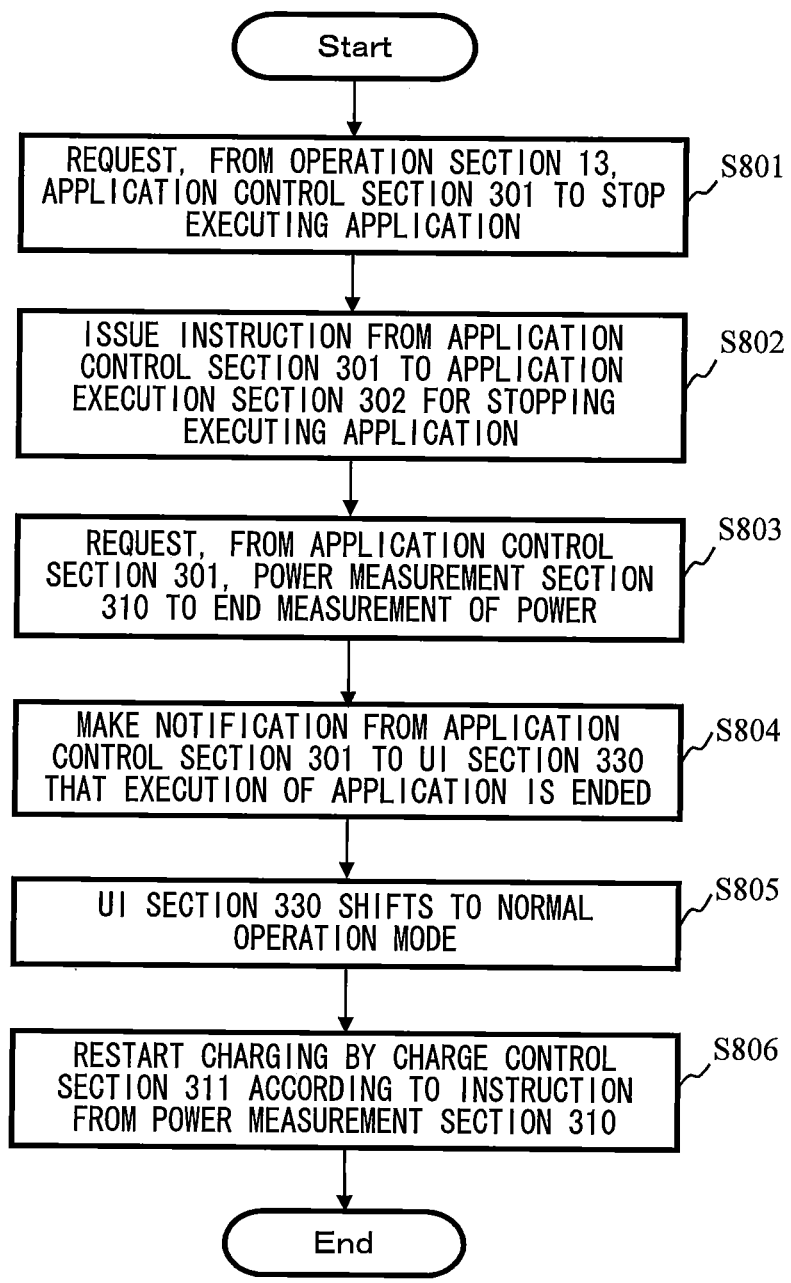
FIG. 21 illustrates an example of a flow chart for a process performed when an operation is performed by a user in the case of the connection to the battery charger occurring, according to the third embodiment of the present invention.

The process of executing an application while connection to the battery charger occurs as described above is likely to be stopped halfway due to an operation performed by a user or cancellation of the connection to the battery charger. A process for such a case will be described with reference to FIG. 21. In FIG. 21, in particular, a case is described in which the process is stopped due to an operation performed by a user. However, also when the process is stopped due to any trigger such as cancellation of connection to the battery charger, a similar process is performed.

When an operation is performed by a user, the operation section 13 firstly requests the application control section 301 to end the execution of the application (step S801). When receiving this request, the application control section 301 requests the application execution section 302 to stop the execution of the application (step S802), and requests the power measurement section 310 to end the measurement of power (step S803). When receiving, from the application execution section 302, the notification that the execution of the application has been ended, the application control section 301 notifies the UI section 330 that the execution of the application has been ended (step S804), and the UI section 330 shifts to the normal operation mode (step S805). Finally, when connection to the battery charger occurs, the power measurement section 310 requests the charge control section 311 to restart the charging operation (step S806). Thus, a subsequent process based on the operation performed by the user can be executed.

The portable information processing terminal 30 according to the third embodiment may have, in addition to the features of the embodiment described above, features that, for example, the portable information processing terminal 30 does not execute an operation designated by a user, and/or does not make communication with the outside, while an application is executed for obtaining the power consumption information. In this case, the power measurement section 310 according to the third embodiment may further hold therein power consumption data of the operation section 13. The power consumption data of the operation section 13 is practical data representing a value of power that enables power used in the operation section 13 to be calculated based on an operation state (the number of times a user performs an operation, and the like) of the operation section 13. Further, the power measurement section 310 according to the third embodiment may further hold therein power consumption data of the external connection section 16. The power consumption data of the external connection section 16 is practical data representing a value of power that enables power used in the external connection section 16 to be calculated based on an operation state (the number of times communication is made, radio field intensity, and the like) of the external connection section 16. The power measurement section 310 stops operations of the operation section 13 and the external connection section 16 in the pseudo operation mode, and measures a power consumption, per unit time, for the application being executed, based on the power consumption data. Further, the portable information processing terminal 30 can operate, in the pseudo operation mode, components other than those described above. For example, a GPS device, various sensors, a camera, and the like may be operated in the pseudo operation mode.

As described above, in the portable information processing terminal 30 according to the third embodiment of the present invention, the application control section 301 executes, when connection to the battery charger occurs, an application for which the power consumption information per unit time has not been obtained, according to the notification from the application status management section 100, and the power measurement section 310 measures power consumption, per unit time, for the application being executed, so that the power consumption, per unit time, for the application for which the power consumption information has not been obtained can be measured while connection to the battery charger occurs. Thus, before a user explicitly operates to execute an unspecified application, the execution-enabled time period for the application can be obtained.

Further, in the portable information processing terminal 30 according to the third embodiment, when connection to the battery charger occurs, and an application for which the power consumption information has not been obtained is being executed, the UI section 330 does not perform a screen display and a sound output, so that a display and a sound output which are not expected by a user are not performed. Further, power consumption can be reduced for executing an application, and a time period for charging operation can be reduced.

(Fourth Embodiment)

Next, a portable information processing terminal 40 according to a fourth embodiment will be described. In the first to the third embodiments, while connection to the battery charger occurs, a power consumption for an application is measured. On the other hand, the portable information processing terminal 40 according to the fourth embodiment can measure a power consumption for an application also when connection to the battery charger does not occur.

<Configuration of Portable Information Processing Terminal 40>

Figure 22:
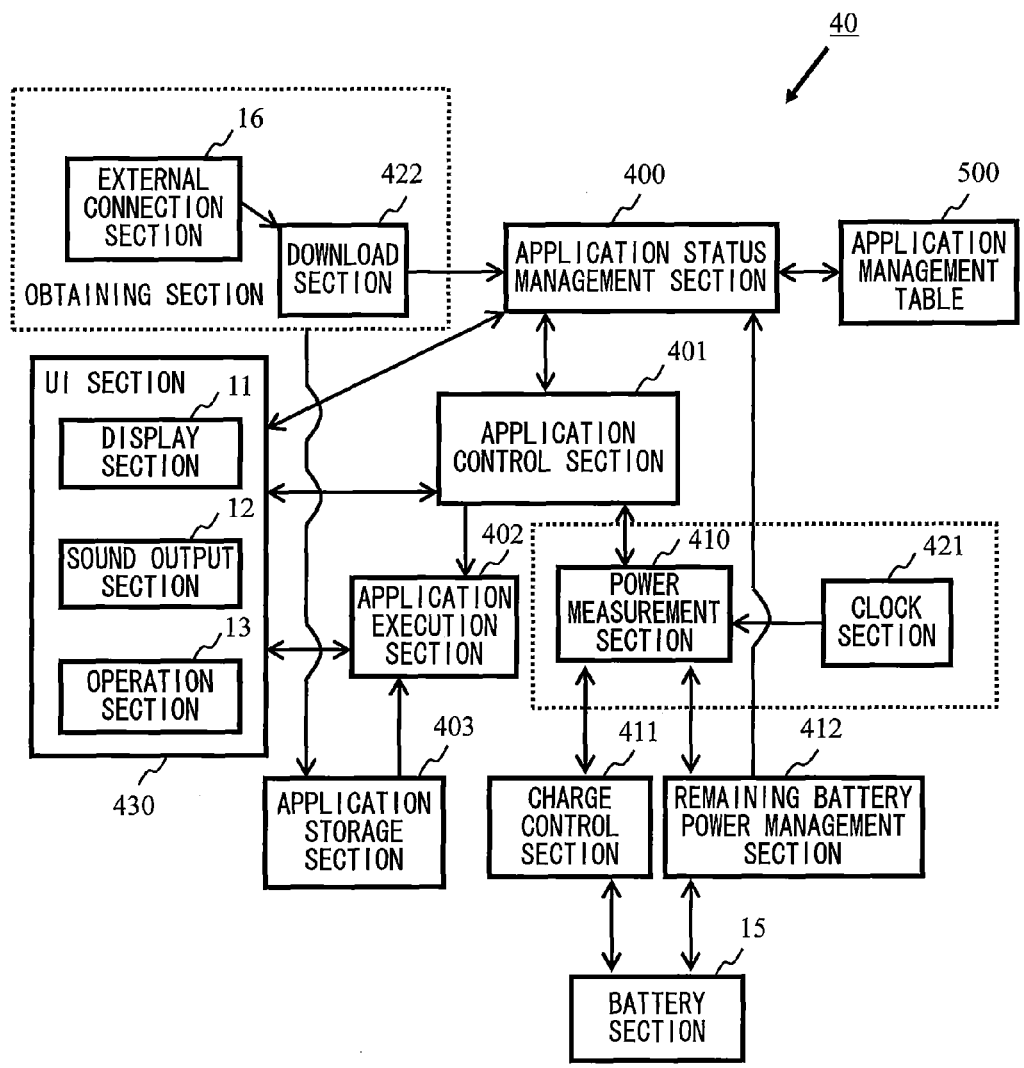
FIG. 22 is a block diagram illustrating an exemplary configuration of a portable information processing terminal 40 according to a fourth embodiment of the present invention.

FIG. 22 is a block diagram illustrating an exemplary configuration of the portable information processing terminal 40 according to the fourth embodiment of the present invention. In FIG. 22, the portable information processing terminal 40 according to the fourth embodiment includes the battery section 15, the external connection section 16, an application status management section 400, an application control section 401, an application execution section 402, an application storage section 403, a power measurement section 410, a charge control section 411, a remaining battery power management section 412, a clock section 421, a download section 422, a UI section 430, the application management table 500, and the like.

In FIG. 22, the application status management section 400, the application control section 401, the application execution section 402, the application storage section 403, the charge control section 411, the clock section 421, the download section 422, and the UI section 430 have functions equivalent to those of the application status management section 100, the application control section 101, the application execution section 102, the application storage section 103, the charge control section 111, the clock section 121, the download section 122, and the UI section 130, respectively, which are described in the first embodiment, and the description thereof is not given.

The power measurement section 410 measures a power consumption, per unit time, for an application being executed. When receiving, from the application control section 401, a notification that execution of an application is started, and a notification that the execution of the application is stopped, the power measurement section 410 measures a power consumption. The power measurement section 410 obtains, from the remaining battery power management section 412, a value of a remaining battery power at each of a time at which the execution of the application is started and a time at which the execution of the application is stopped, thereby calculating a power consumption for the application. Further, the power measurement section 410 obtains, from the clock section 421, a time at which the execution of the application is started, and a time at which the execution of the application is stopped, thereby measuring a power consumption per unit time.

<Process of Measuring Power Consumption>

Subsequently, a process of obtaining power consumption information of an application having been just downloaded, will be described with reference to FIG. 23, FIG. 24, and FIG. 25. In the present embodiment, the portable information processing terminal 40 measures a power consumption for the application having been just downloaded, at any necessary time. The necessary time represents, for example, a time at which an instruction is issued from a user through the operation section 13 or the like, and a time at which the portable information processing terminal 40 is powered ON/OFF. Further, the measurement may be performed at predetermined time intervals, or the measurement may be automatically performed immediately after an application is downloaded, or the measurement may be performed when a user executes the application for the first time. Hereinafter, a case will be described where the measurement is performed when an instruction is issued from a user. In order to prevent the remaining battery power of the battery section 15 from being used up during the execution of the application, when the remaining battery power measured immediately before the application is executed indicates a value less than a predetermined value, it is preferable that the application is not executed.

Figure 23:
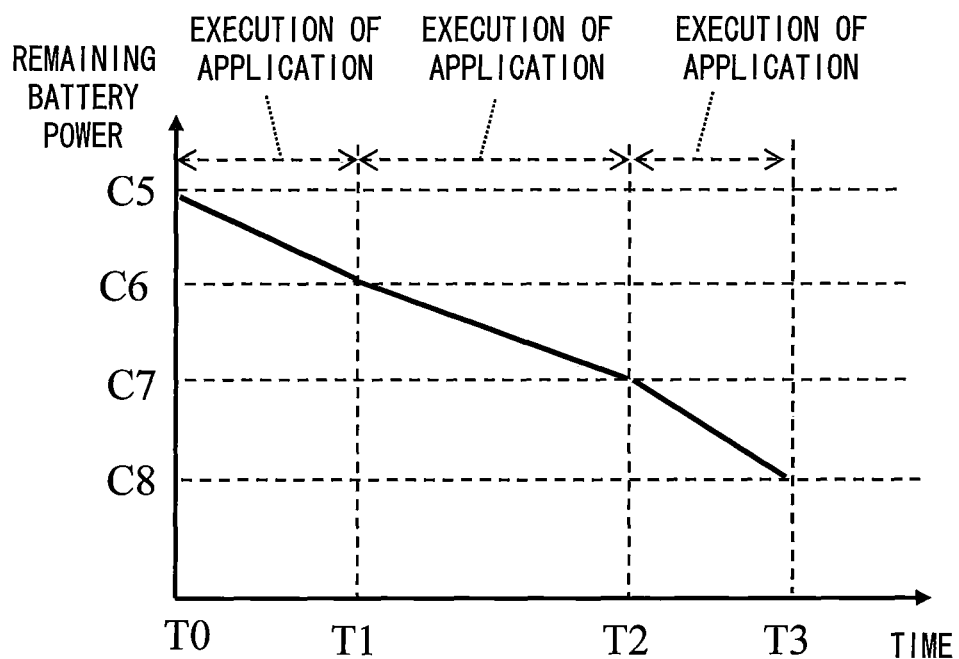
FIG. 23 illustrates an exemplary transition of a remaining battery power measured when a power consumption is being measured, according to the fourth embodiment of the present invention.

FIG. 23 illustrates an exemplary transition of a remaining battery power measured when a power consumption is being measured. In FIG. 23, the remaining battery power measured immediately before the application is executed is represented as C5. The portable information processing terminal 40 executes the application having been just downloaded until the remaining battery power reaches a sixth predetermined value C6 (a time period from a time T0 to a time T1 in FIG. 23). When the remaining battery power has reached the sixth predetermined value C6 (at time T1 in FIG. 23), the execution of the application is stopped. A difference in the battery capacity (which is almost equivalent to a difference between C5 and C6) is divided by a time (the time period from the time T0 to the time T1 in FIG. 23), thereby enabling a power consumption for the application per unit time to be calculated. Hereinafter, threshold values are represented as C7, C8, . . . . The portable information processing terminal 40 repeatedly executes the application until all the applications having been just downloaded have been processed, or until the remaining battery power has been used up (until the remaining battery power becomes less than a predetermined value).

Hereinafter, the process described above will be described in detail with reference to FIG. 24 and FIG. 25.

Figure 24:
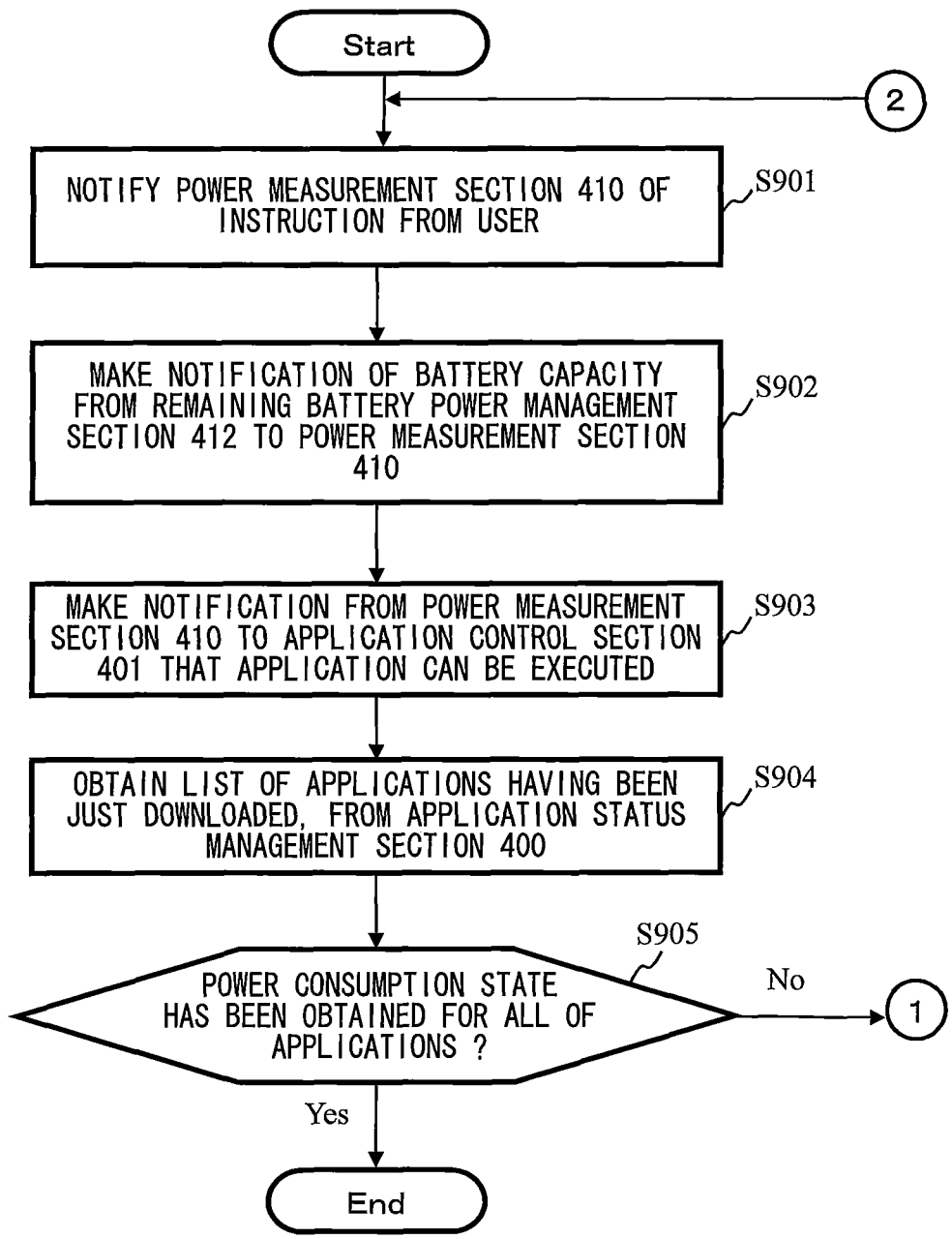
FIG. 24 illustrates an example of a flow chart for a process performed when a power consumption is being measured, according to the fourth embodiment of the present invention.

As shown in FIG. 24, when an instruction for obtaining a value of a power consumption for an application having been just downloaded is issued from a user, the power measurement section 410 is notified thereof (step S901). The remaining battery power management section 412 measures a remaining battery power for the application immediately before the application is executed, and notifies the power measurement section 410 thereof (step S902). The power measurement section 410 notifies the application control section 401 that the application can be executed for measuring the power consumption (step S903). When receiving the notification, the application control section 401 obtains, from the application status management section 400, a list of applications which have been just downloaded and for which the power consumption information for the application management table 500 has not been obtained (step S904). Thereafter, until the power consumption information of all the applications is obtained, the process of obtaining the power consumption information is performed for each application (step S905).

Next, the process of obtaining the power consumption information for each application will be described in detail with reference to FIG. 25. As shown in FIG. 25, the application control section 401 firstly selects one of the applications for which the just-downloaded-states represent TRUE, from the list obtained in step S904, and notifies the application execution section 402 of the application storage location, and instructs the application execution section 402 to execute the application (step S906).

When receiving this instruction, the application execution section 402 obtains the application from the application storage section 403, and executes the application (step S907). Next, when the power measurement section 410 has confirmed, through the application control section 401, that the application is executed, the power measurement section 410 obtains, from the remaining battery power management section 412, a value of a remaining battery power (an obtained value is represented as C10) at that moment, and obtains, from the clock section 421, a time (an obtained value is represented as TM1) at that moment (step S908).

Thereafter, the application execution section 402 continues to execute the application until the remaining battery power management section 412 determines that the remaining battery power becomes lower than or equal to the sixth predetermined value C6 (step S909), or until the clock section 421 determines that a time period longer than or equal to a predetermined value T10 has elapsed (step S910). When a result of the determination in step S909 or step S910 is affirmative, the power measurement section 410 obtains a value of a remaining battery power (an obtained value is represented as C20) at that moment from the remaining battery power management section 412, and obtains a time (an obtained value is represented as TM2) at that moment from the clock section 421 (step S911).

Next, the power measurement section 410 calculates a power consumption AW for the application per unit time by using (equation 1) described above (step S912), and notifies the application control section 401 of the power consumption AW (step S913). The application control section 401 instructs the application execution section 402 to end the execution of the application (step S919). When it has been confirmed that the execution of the application is ended, the application control section 401 notifies the application status management section 400 of the power consumption AW for the application (step S915). When receiving the notification, the application status management section 400 updates the application management table 500 (step S916). Specifically, the application status management section 400 sets FALSE to the just-downloaded state information of the corresponding application, and sets a value of AW to the power consumption information of the application.

As described above, in the portable information processing terminal 40 according to the fourth embodiment of the present invention, the application control section 401 executes an application for which the power consumption information per unit time has not been obtained, according to the notification from the application status management section 400, and the power measurement section 410 measures a power consumption, per unit time, for the application being executed, so that the power consumption, per unit time, for the application for which the power consumption information has not been obtained can be measured while connection to the battery charger occurs. Thus, before a user explicitly operates to execute an unspecified application, the execution-enabled time period for the application can be obtained. Further, according to the fourth embodiment, also when the portable information processing terminal 40 does not connect to the battery charger, a power consumption, per unit time, for an application for which the power consumption information has not been obtained, can be measured.

(Fifth Embodiment)

Next, a portable information processing terminal 50 according to a fifth embodiment will be described. The fifth embodiment is different from the first to the fourth embodiments in that the portable information processing terminal 50 according to the fifth embodiment executes, in a power measurement mode, an application for measuring a power consumption. The portable information processing terminal 50 according to the fifth embodiment has a configuration similar to those of the first to the fourth embodiments. Therefore, the description will be given below with reference to FIG. 2. Further, an operation of the portable information processing terminal 50 is different from those of the first to the fourth embodiments in step S308 shown in FIG. 10, step S507 shown in FIG. 15, step S712 shown in FIG. 20, and step S907 shown in FIG. 25.

Specifically, in steps S308, S507, S712, and S907, the application execution section 102 obtains an application from the application storage section 103, and executes, if the obtained application is executable in the power measurement mode, the application in the power measurement mode. The application execution section 102 executes the application in the same manner as described in each of the first to the fourth embodiments unless the obtained application is executable in the power measurement mode. The power measurement mode is an operation mode, for an application, which is specialized for measuring power.

When the application execution section 102 executes an application in the power measurement mode, the power measurement section 110 is allowed to measure a power consumption for the application per unit time in a manner approximate to a manner in practical use. Further, when an operation mode determined in consideration of, for example, sound output, video reproduction, users' operation, and communication status which are observed in the case of the application being executed in an average manner, is predefined as the power measurement mode, the power measurement section 110 is allowed to measure the power consumption for the application per unit time, based on a predefined average used state. Further, the application execution section 102 may execute, as the power measurement mode, a demonstration mode or the like which is provided for each application.

Figure 26:
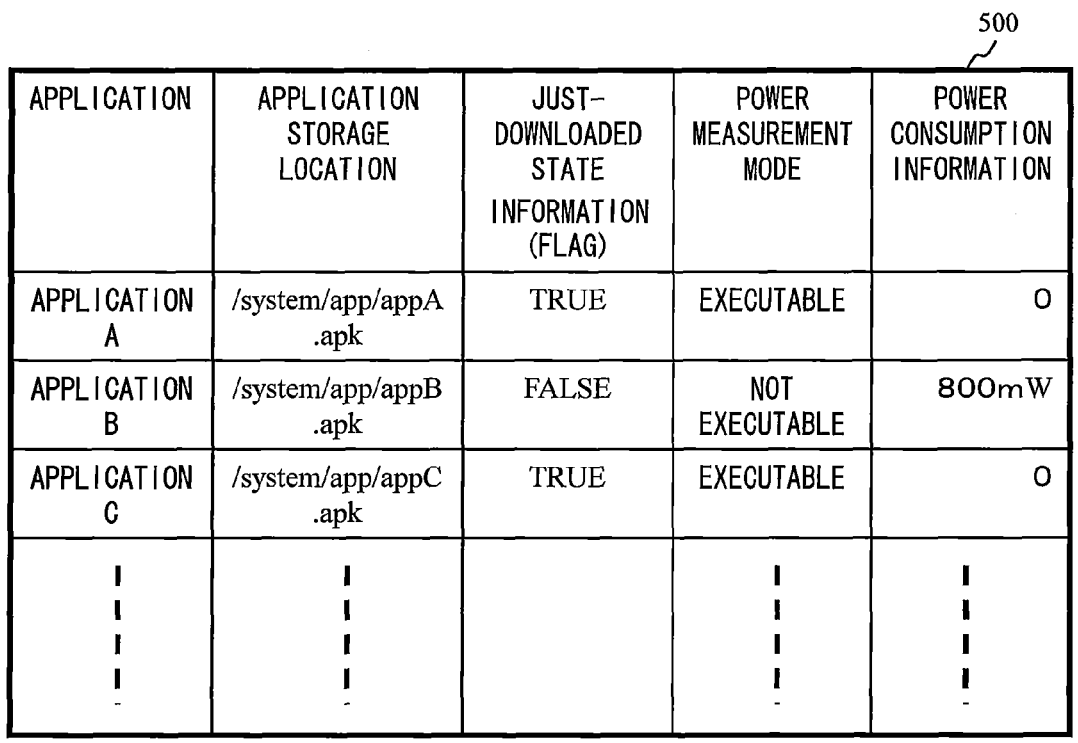
FIG. 26 illustrates an exemplary application management table according to a fifth embodiment of the present invention.

The portable information processing terminal 50 may perform management, by using the application management table 500, as to whether the power measurement mode is executable or not for each application (see, for example, FIG. 26). In such a case, in steps S307, S506, S711, and S906, the application control section 101 determines, with reference to the application management table 500, whether an application to be executed is executable in the power measurement mode, and executes the application according to the determination result.

Further, it should be understood that the portable information processing terminal 50 can operate the display section 11, the sound output section 12, the operation section 13, the external connection section 16, and the like in the pseudo operation mode, as described in the third embodiment, also when the application is being executed in the power measurement mode.

As described above; in the portable information processing terminal 50 according to the fifth embodiment of the present invention, an application is executed, for measuring a power consumption, in the power measurement mode, and therefore a power consumption, per unit time, for an application for which the power consumption information has not been obtained can be measured in a manner approximate to a manner in practical use.

(Sixth Embodiment)

Next, a portable information processing terminal 60 according to a sixth embodiment will be described. The sixth embodiment is different from the first to the fifth embodiments in that the portable information processing terminal 60 according to the sixth embodiment can execute an application for measuring a power consumption, based on a user's operation preference. The application operation preference is used because, when, for example, an application that requires use of a camera is executed, the number of times a picture is taken, and the number of times a moving picture is taken are different among users, and a power consumption per unit time is greatly different depending on the user's operation preference.

Figure 27:
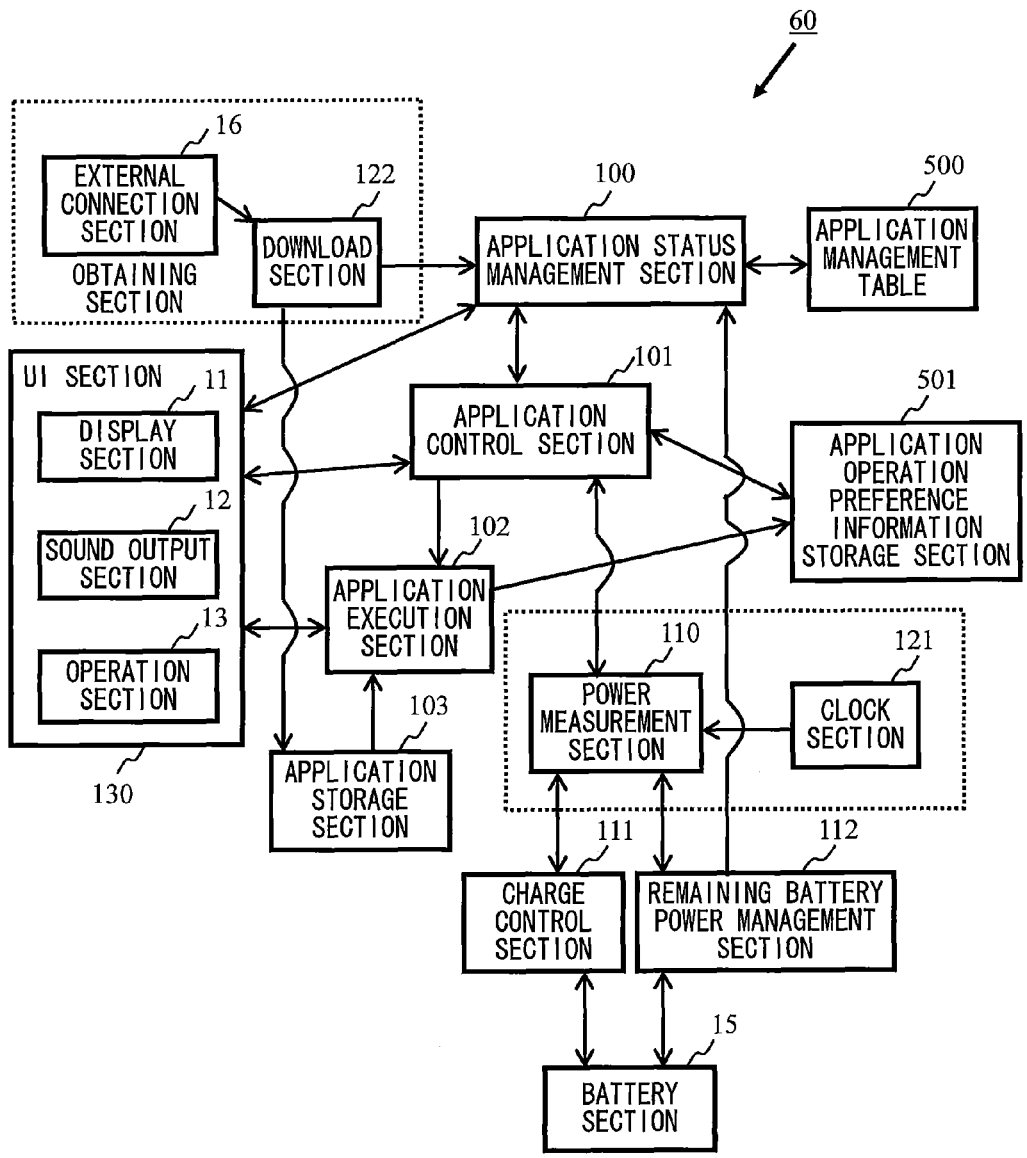
FIG. 27 is a block diagram illustrating an exemplary configuration of a portable information processing terminal 60 according to a sixth embodiment of the present invention.

FIG. 27 is a block diagram illustrating an exemplary configuration of the portable information processing terminal 60 according to the sixth embodiment of the present invention. The portable information processing terminal 60 according to the sixth embodiment further includes an application operation preference information storage section 501 in addition to the components described in the first to the fifth embodiments. When an application is executed, the application control section 101 monitors an application operation state. The application control section 101 measures, based on the result of the monitoring, an operation state (for example, the number of times a sound output is performed, the number of times a display is updated, the display image size, a user's operation state, the number of times communication is made) per unit time while the application is being executed, and stores the operation state as application operation preference information in the application operation preference information storage section 501. A time period during which the application operation state is monitored may be several hours to several days, and the time period may be different for each application.

When the application operation preference information is not stored in the application operation preference information storage section 501 because, for example, an application has not been executed, the power measurement section 110 measures a power consumption, per unit time, for an application for which the power consumption information has not been obtained, as described above in the first to the fifth embodiments. When the application operation preference information is stored in the application operation preference information storage section 501, an application is executed based on the application operation preference information, and the power measurement section 110 measures a power consumption per unit time, for the application for which the power consumption information has not been obtained. Thus, the portable information processing terminal 60 is allowed to measure a power consumption, per unit time, for an application for which the power consumption information has not been obtained, based on the user's operation preference. The application operation preference information may be updated each time an application is executed, or may be periodically updated. Further, the application operation preference information may be explicitly updated by a user's operation.

Hereinafter, an example of a specific use thereof will be described. When an application that requires use of a camera is executed, the number of times a picture is taken, and the number of times a moving picture is taken are different among users, and a power consumption per unit time is greatly different depending on user's operation preference. In such a case, when the application that requires use of a camera is executed, the portable information processing terminal 60 obtains, per unit time, the number of times a picture and/or a moving picture is taken, and the like, and stores, as the application operation preference information, the number of times having been obtained, thereby enabling the power consumption per unit time to be measured based on the user's operation preference.

Further, also when an application of a game is executed, game operations and the like are different among users. When an application for displaying a television is executed, for example, the number of times a channel is switched is different among users. When an application in which a photo frame is used is executed, for example, the number of times a picture or a BGM is switched is different. The power consumption, per unit time, for an application being executed is different depending on these differences. Therefore, the portable information processing terminal 60 effectively measures a power consumption based on the user's operation preference.

Further, it should be understood that the portable information processing terminal 60 may operate, in the pseudo operation mode, the display section 11, the sound output section 12, the operation section 13, the external connection section 16, and the like, as described in the third embodiment, also when the application is being executed based on the application operation preference information.

As described above, in the portable information processing terminal 60 according to the sixth embodiment of the present invention, an application is executed, for measuring a power consumption, based on the application operation preference information, and therefore a power consumption, per unit time, for an application for which the power consumption information has not been obtained can be measured based on the user's application operation preference.

Further, the portable information processing terminal 60 updates the execution-enabled time period in the list of applications as shown in FIGS. 5(*b*) and (*c*), based on the power consumption calculated according to the user's operation preference. Thus, the execution-enabled time period of each application can be displayed according to the user's operation preference. Further, the portable information processing terminal 60 is also allowed to calculate the execution-enabled time period of the whole terminal based on the execution-enabled time period of each application. Thus, the portable information processing terminal 60 can calculate and display the execution-enabled time period of the whole terminal according to the user's operation preference.

Figure 28:
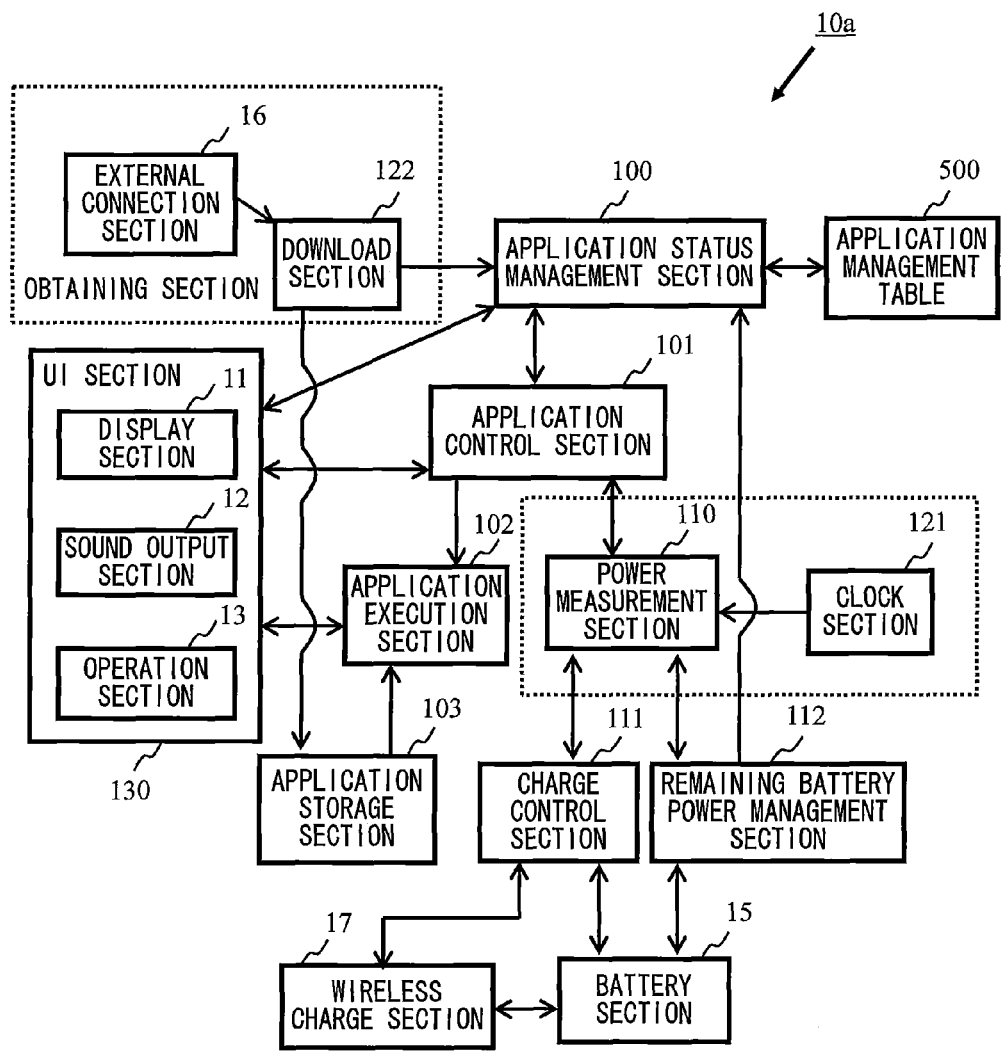
FIG. 28 is a block diagram illustrating an exemplary configuration of a portable information processing terminal 10a which is wirelessly charged.

The portable information processing terminal according to each of the embodiments described above may be connected to a wireless battery charger, and wirelessly charged. As the wireless charging method, a static-state type electromagnetic induction method, a moving-state type electromagnetic induction method, a radio wave method, a magnetic resonance method, or the like is used. FIG. 28 is a block diagram illustrating an exemplary configuration of a portable information processing terminal 10a which is wirelessly charged. The portable information processing terminal 10a further includes a wireless charge section 17 connected to an external power supply, in addition to the components described above. The wireless charge section 17 charges the battery section 15 under control of the charge control section 111.

Further, although an exemplary case is described in which the portable information processing terminal according to each of the embodiments described above measures a power consumption, per unit time, for an application for which the power consumption information has not been obtained, a power consumption, per unit time, for an application for which the power consumption information has been obtained may be re-measured, to update the power consumption information. Even when the power consumption information for an application has been obtained, a process of the application may be changed and/or the configuration of the portable information processing terminal may be modified over the passage of time, so that the power consumption per unit time is likely to be changed. Further, a power consumption per unit time may be changed due to a user's operation preference being changed. The update may be periodically performed or may be explicitly performed according a user's operation.

Further, process steps implemented by the functional blocks included in the portable information processing terminal described in each of the embodiments of the present invention may be realized by a CPU interpreting and executing predetermined program data that enables execution of the process steps described above and that is stored in a storage device (a ROM, a RAM, a hard disk, or the like). In this case, the program data may be loaded into the storage device via a storage medium, or may be directly executed from the storage medium. Examples of the storage medium include: a semiconductor memory such as a ROM, a RAM, and a flash memory; a magnetic disk memory such as a flexible disk and a hard disk; an optical disc memory such as a CD-ROM, a DVD, and a BD; and a memory card. Further, the storage medium represents a concept including a communication medium such as a telephone line and a carrying path.

Each functional block included in the portable information processing terminal described in each of the embodiments of the present invention may be realized as an LSI that is an integrated circuit. For example, in the portable information processing terminal 10, the application status management section 100, the application control section 101, the application execution section 102, the power measurement section 110, the charge control section 111, the remaining battery power management section 112, the clock section 121, and the download section 122 may be formed as an integrated circuit. These components may be independently formed in one chip, or a portion or the entirety of these components may be formed in one chip. Depending on difference in degree of integration, the LSI may be referred to as an IC, a system LSI, a super LSI, or an ultra LSI.

Further, a method for circuit integration is not limited to the LSI. The circuit integration may be realized using a dedicated circuit or a general-purpose processor. Further, an FPGA (Field Programmable Gate Array), which can be programmed after manufacturing an LSI, or a reconfigurable processor, which enables connections or settings of circuit cells in an LSI to be reconfigured, may be used. Still further, a configuration may be used in which a hardware resource includes a processor, a memory, and the like, and the processor executes a control program stored in a ROM.

Still further, in a case where another integration technology replacing the LSI becomes available due to an improvement of a semiconductor technology or due to emergence of another technology derived therefrom, it should be understood that the function blocks may be integrated using such technology. For example, biotechnology may be applied.

INDUSTRIAL APPLICABILITY

The portable information processing terminal according to the present invention is useful as, for example, a portable information processing terminal which has a function of, for example, notifying a user of an execution-enabled time period of an application having been later-installed, and in which an application can be installed.

DESCRIPTION OF THE REFERENCE CHARACTERS 10, 20, 30, 40, 50, 60 portable information processing terminal
11 display section
12 sound output section
13 operation section,
15 battery section
16 external connection section
17 wireless charge section
100, 200, 300, 400 application status management section
101, 201, 301, 401 application control section
102, 202, 302, 402 application execution section
103, 203, 303, 403 application storage section
110, 210, 310, 410 power measurement section
111, 311, 411 charge control section
211 charge control section
112, 212, 312, 412 remaining battery power management section
121, 221, 321, 421 clock section
122, 222, 322, 422 download section
130, 230, 330, 340 UI section
331 IF section
332 UI control section
333 operation mode management section
334 pseudo operation section
500 application management table
501 application operation preference information storage section

The invention claimed is:
1. A portable information processing terminal, comprising:
an application storage section in which an application is stored;
an obtaining section for obtaining an application from an outside, and storing the obtained application in the application storage section;
an application management table in which a power consumption, per unit time, for the application stored in the application storage section, is registered;
a battery section for supplying power to the portable information processing terminal;

a charge control section for detecting for connection to a battery charger, and controlling whether the battery section is to be charged by using the battery charger;

a remaining battery power management section for managing a remaining battery power in the battery section;

an application control section for requesting the application stored in the application storage section to be executed;

an application execution section for executing the application according to a request from the application control section;

a power measurement section for measuring the power consumption per unit time for the application which is being executed;

an application status management section for managing the application management table, and calculating an execution-enabled time period for the application, based on the power consumption for the application per unit time, and the remaining battery power in the battery section; and a display section for displaying the execution-enabled time period for the application, wherein the power measurement section determines that the remaining battery power of the battery section is greater than or equal to a first predetermined value, and requests the application control section to execute the application for which the power consumption information per unit time has not been obtained, to measure the power consumption for the application per unit time.

2. The portable information processing terminal according to claim 1, wherein a flag indicating whether the power consumption information per unit time has been obtained or not is stored in the application management table for each application stored in the application storage section.

3. The portable information processing terminal according to claim 2, wherein the obtaining section stores, when the application is obtained, the flag indicating that the power consumption information for the application per unit time has not been obtained, through the application status management section, in the application management table.

4. The portable information processing terminal according to claim 1, further comprising an operation section for receiving an operation from a user, wherein the application status management section
obtains a value of the remaining battery power from the remaining battery power management section, and obtains, from the application management table, a value of the power consumption for each application per unit time, when the user requests, through the operation section, the execution-enabled time period for each application to be displayed, and calculates the execution-enabled time period for each application, based on the remaining battery power and the power consumption per unit time, and displays, on the display section, the execution-enabled time period having been calculated.

5. The portable information processing terminal according to claim 2, further comprising an operation section for receiving an operation from a user, wherein the application status management section
obtains a value of the remaining battery power from the remaining battery power management section, and obtains, from the application management table, a value of the power consumption for each application per unit time, and the flag, when the user requests, through the operation section, the execution-enabled time period for each application to be displayed, calculates the execution-enabled time period for the application for which the flag does not indicate that the power consumption information per unit time has not been obtained, based on the remaining battery power, and the power consumption per unit time, and displays, on the display section, the execution-enabled time period having been calculated, and indicates, for the application for which the flag indicates that the power consumption information per unit time has not been obtained, that the execution-enabled time period has not been obtained, on the display section.

6. The portable information processing terminal according to claim 1, wherein the power measurement section
issues an instruction for stopping charging the battery section, and requests the application control section to execute the application for which the power consumption information per unit time has not been obtained, when determining through the charge control section that the portable information processing terminal is connected to the battery charger, and determining through the remaining battery power management section that the remaining battery power of the battery section indicates a value greater than or equal to a first predetermined value, and requests the application control section to stop executing the application, measures the power consumption for the application per unit time, and issues, through the charge control section, an instruction for restarting charging the battery section, when determining through the remaining battery power management section that the remaining battery power of the battery section indicates a value less than or equal to a second predetermined value, or determining that a time period longer than or equal to a predetermined time period has elapsed after start of execution of the application.

7. The portable information processing terminal according to claim 6, wherein the power measurement section obtains, through the remaining battery power management section, a difference between a remaining battery power of the battery section at the start of the execution of the application, and a remaining battery power of the battery section at stop of the execution of the application, and measures the power consumption for the application per unit time based on the obtained difference in the remaining battery power, and a time period in which the application has been executed.

8. The portable information processing terminal according to claim 1, wherein the power measurement section
requests the application control section to execute the application for which the power consumption information per unit time has not been obtained, when determining through the charge control section that the portable information processing terminal is connected to the battery charger, and the remaining battery power of the battery section indicates a value greater than or equal to a first predetermined value, and requests the application control section to stop executing the application, and measures the power consumption for the application per unit time, when determining through the charge control section that the remaining battery power of the battery section indicates a value less than or equal to a second predetermined value, or determining that a time period longer than or equal to a predetermined time period has elapsed after start of execution of the application.

9. The portable information processing terminal according to claim 8, wherein the power measurement section obtains, through the remaining battery power management section, a difference between a remaining battery power of the battery section at the start of the execution of the application, and a remaining battery power of the battery section at stop of the execution of the application, and obtains, through the charge control section, a capacity of the battery section that is charged from the start of the execution of the application to the stop of the execution of the application, to measure the power consumption for the application per unit time, based on the obtained difference in the remaining battery power, the capacity obtained by the charging, and a time period in which the application has been executed.

10. The portable information processing terminal according to claim 6, wherein when execution of the application is requested, the application control section obtains a list of applications for each of which the power consumption information per unit time has not been obtained, through the application status management section, from the application management table, causes the application execution section to execute each application contained in the obtained list, and notifies the power measurement section that the application has been executed.

11. The portable information processing terminal according to claim 6, wherein the application control section registers the power consumption for the application per unit time, which has been measured by the power measurement section, and the flag indicating that the power consumption information per unit time has been obtained, through the application status management section, in the application management table.

12. The portable information processing terminal according to claim 10, wherein, when an operation performed by the user is detected through the operation section, the application control section instructs the application execution section to stop executing the application, instructs the power measurement section to stop measuring the power consumption, and instructs the charge control section to restart charging the battery section.

13. The portable information processing terminal according to claim 10, further comprising:
a sound output section for outputting a sound;
a UI control section for controlling the display section and the sound output section;
a pseudo operation section for merely making a response without controlling the display section and the sound output section when receiving a control request for the display section and the sound output section, and storing, according to a request from the power measurement section, a status of an operation required for each of the display section and the sound output section based on the control request for each of the display section and the sound output section;
an IF section that implements operation modes that are a normal operation mode and a pseudo operation mode, and, when receiving a request from any one of the application status management section, the application control section, and the application execution section, notifies the UI control section of the request in the case of the operation mode representing the normal operation mode, and notifies the pseudo operation section of the request in the case of the operation mode representing the pseudo operation mode; and
an operation mode management section for controlling the operation modes of the IF section based on an operation mode setting request from the application control section, wherein
the power measurement section holds therein power consumption data based on a status of an operation of each of the display section and the sound output section.

14. The portable information processing terminal according to claim 13, wherein the application control section requests, when the application contained in the obtained list is executed by the application execution section, the operation mode management section to operate for shifting to the pseudo operation mode, and requests, when the execution of the application has been ended, the operation mode management section to operate for shifting to the normal operation mode.

15. The portable information processing terminal according to claim 14, wherein the power measurement section obtains, through the remaining battery power management section, a difference between a remaining battery power of the battery section at start of execution of the application, and a remaining battery power of the battery section at stop of the execution of the application, and measures the power consumption for the application per unit time based on the obtained difference in the remaining battery power, a time period in which the application has been executed, and the status of the operation which is required for each of the display section and the sound output section, and which is stored by the pseudo operation section.

16. The portable information processing terminal according to claim 1, wherein, in a power measurement mode that is an application operation mode specialized for measuring power, the application execution section executes the application.

17. The portable information processing terminal according to claim 1, further comprising
an application operation preference information storage section for storing a status of an operation, per unit time, of the application which is being executed, wherein
the application execution section executes the application, based on application operation preference information stored in the application operation preference information storage section, and
the power measurement section measures the power consumption per unit time for the application when the application is executed.

18. A method performed by a portable information processing terminal including a battery section, an application storage section, and a display section, the method comprising the steps of:
obtaining an application from an outside, and storing the obtained application in the application storage section;
supplying power to the portable information processing terminal from the battery section;
detecting for connection to a battery charger, and controlling whether the battery section is to be charged by using the battery charger;
determining that a remaining battery power in the battery section is greater than or equal to a first predetermined value;
making a request for executing the application stored in the application storage section;
executing the application according to the request;
measuring a power consumption per unit time for the application which is being executed;

managing an application management table in which the power consumption, per unit time, for the application is registered;

calculating an execution-enabled time period for the application, based on the power consumption for the application per unit time, and the remaining battery power in the battery section; and displaying the execution-enabled time period for the application on the display section.

19. A non-transitory computer-readable medium having a program stored thereon to be executed by a portable information processing terminal including a battery section, an application storage section, and a display section, the program comprising the steps of:

obtaining an application from an outside, and storing the obtained application in the application storage section;

supplying power to the portable information processing terminal from the battery section;

detecting for connection to a battery charger, and controlling whether the battery section is to be charged by using the battery charger;

determining that a remaining battery power in the battery section is greater than or equal to a first predetermined value;

making a request for executing the application stored in the application storage section;

executing the application according to the request;

measuring a power consumption per unit time for the application which is being executed;

managing an application management table in which the power consumption, per unit time, for the application is registered;

calculating an execution-enabled time period for the application, based on the power consumption for the application per unit time, and the remaining battery power in the battery section; and displaying the execution-enabled time period for the application on the display section.

\* \* \* \* \*